(12) United States Patent
Tang

(10) Patent No.: US 7,200,210 B2
(45) Date of Patent: Apr. 3, 2007

(54) VOICE CONTROLLED BUSINESS SCHEDULING SYSTEM AND METHOD

(76) Inventor: Yi Tang, 712 Player Dr., Plano, TX (US) 75025

( * ) Notice: Subject to any disclaimer, the term of this patent is extended or adjusted under 35 U.S.C. 154(b) by 636 days.

(21) Appl. No.: 10/443,363

(22) Filed: May 22, 2003

(65) Prior Publication Data

US 2004/0001575 A1    Jan. 1, 2004

Related U.S. Application Data

(60) Provisional application No. 60/392,572, filed on Jun. 27, 2002.

(51) Int. Cl.
*H04M 11/00* (2006.01)

(52) U.S. Cl. .................. 379/93.15; 379/88.04; 379/88.18; 379/88.23; 379/90.01; 379/210.01; 709/218; 715/513; 715/727

(58) Field of Classification Search ............. 379/93.15, 379/88.04, 88.18, 88.23, 90.01, 93.12, 210.01; 709/218; 715/513, 727
See application file for complete search history.

(56) References Cited

U.S. PATENT DOCUMENTS

| | | | |
|---|---|---|---|
| 5,093,854 A | | 3/1992 | Sucato |
| 5,113,380 A | | 5/1992 | Levine |
| 5,289,531 A | * | 2/1994 | Levine ..................... 379/93.23 |
| 5,848,395 A | | 12/1998 | Edgar et al. |
| 5,982,863 A | * | 11/1999 | Smiley et al. ........... 379/88.18 |
| 6,018,568 A | * | 1/2000 | Furman et al. .......... 379/93.15 |
| 6,345,260 B1 | | 2/2002 | Cummings, Jr. et al. |
| 6,650,738 B1 | * | 11/2003 | Pershan et al. .......... 379/88.03 |
| 6,687,678 B1 | * | 2/2004 | Yorimatsu et al. ............. 705/8 |
| 6,760,412 B1 | * | 7/2004 | Loucks ..................... 379/88.13 |
| 6,928,156 B2 | * | 8/2005 | Book et al. ............ 379/265.01 |
| 2001/0011225 A1 | | 8/2001 | O'Connor et al. |
| 2001/0019603 A1 | | 9/2001 | McMahon |
| 2001/0027481 A1 | | 10/2001 | Whyel |
| 2001/0047264 A1 | * | 11/2001 | Roundtree .................. 704/275 |
| 2001/0051892 A1 | | 12/2001 | Brown |
| 2002/0019755 A1 | * | 2/2002 | Kagami ......................... 705/5 |
| 2002/0035493 A1 | * | 3/2002 | Mozayeny et al. ............ 705/5 |
| 2002/0080927 A1 | | 6/2002 | Uppaluru |
| 2002/0138325 A1 | * | 9/2002 | Mashimo et al. ............... 705/8 |
| 2003/0123618 A1 | * | 7/2003 | Bhargava et al. ........ 379/88.01 |

FOREIGN PATENT DOCUMENTS

WO    WO9418667    8/1994

* cited by examiner

*Primary Examiner*—Fan Tsang
*Assistant Examiner*—Hemant Patel
(74) *Attorney, Agent, or Firm*—Dennis R. Haszko

(57) ABSTRACT

A fully automated, voice controlled business appointment/reservation system is provided. The system has a natural language voice user interface that emulates a live office administrator for appointment/reservation bookkeeping. It includes an efficient availability searching mechanism which enables a telephone user to quickly search and reserve available time slot based on his preference. Other described novel features and implementation improvements include method and system for voice controlled appointment/reservation cancellation, method and system for voice controlled appointment/reservation waiting list, method and system for new user service sign-up and account creation, method and system enabling sequential selective dialing of a telephone user list by voice command, and method and system for scheduling data administration by voice commands.

10 Claims, 23 Drawing Sheets

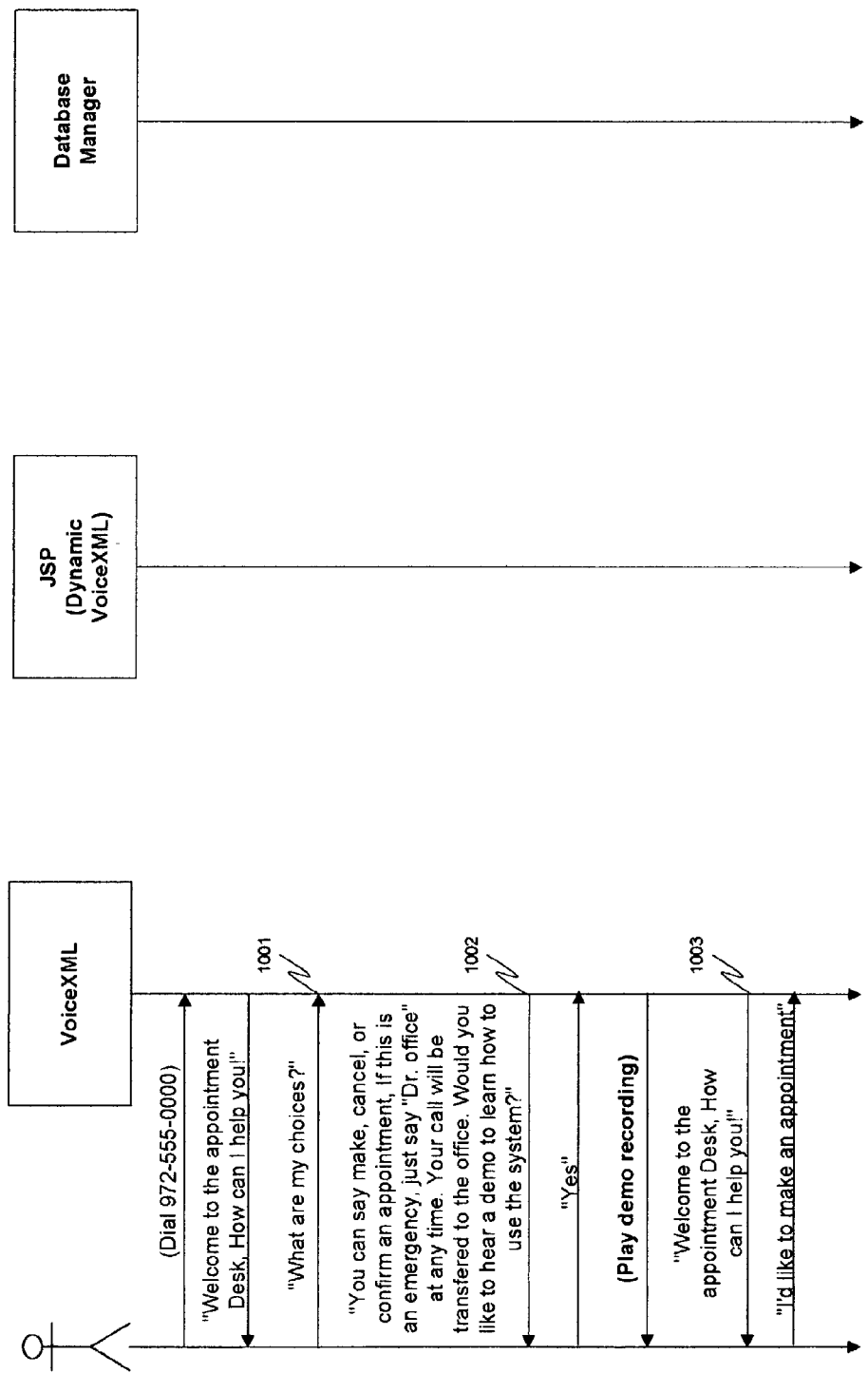

VOICE CONTROLLED BUSINESS SCHEDULING SYSTEM AND METHOD

RELATED U.S. APPLICATION DATA

This application claims the benefit of U.S. Provisional Application No. 60/392,572, filed Jun. 27, 2002.

FEDERALLY SPONSORED RESEARCH

Not Applicable.

SEQUENCE LISTING OR PROGRAM

Not Applicable.

FIELD OF THE INVENTION

The invention is a business appointment/reservation system that is fully voice controlled. The preferred embodiment implements a natural language voice user interface using ASR (Automatic Speech Recognition), TTS (Text To Speech), and VoiceXML (Voice Extensible Markup Language) techniques.

As targets of applications, such a system can be used by any business where services are provided on appointment/reservation basis. For examples, it can be used by doctor offices, hairdresser shops, restaurants, or sport centers where customers need to make reservation for different service facilities (tennis court, golf course, etc). Such a system can also be used for service subscription or sign up (example shown in FIGS. 12A, 12B).

Note that this system can support multiple languages even though only English is used to illustrate the voice user interface in the preferred implementation.

BACKGROUND OF THE INVENTION

Currently there exists mainly two ways for a business office to make reservation/appointment. Most businesses employ an office administrator to take phone calls from customers and help them set up appointment/reservation. A few other businesses deploy a web-based appointment/reservation tool that allows their customers make appointment/reservation from the Internet.

The first option requires human resource and is therefore costly for businesses (particularly for small business that can not afford to hire a full time employee to take phone calls). The second option requires customers to have both computer and Internet access. It is therefore not a practical business solution.

Some patents and patent applications have also proposed to automate the service by using telephone touch tone input (refer to U.S. Pat. No. 5,289,531, U.S. Pat. No. 5,113,380, U.S. Pat. No. 5,093,854, US patent application publication No. 20010011225). This type of system collects telephone user's input via DTMF (Dual Tone Multi Frequency) tones generated when a telephone user presses telephone keys. It is also commonly called IVR (Interactive Voice Response) system because the system's responses to user are usually in the form of pre-recorded human voice.

In reality, a DTMF based IVR system does not have voice recognition capability and can not collect a user's voice input. While being made fully automatic for business owners, it is neither automatic nor friendly to telephone callers. In fact, human factor is entirely disregarded in a DTMF based IVR system in that it does not allow callers to speak; it requires them to listen to often lengthy instructions and respond by only pressing telephone keys.

Ideas of using voice recognition technique in business appointment/reservation system are disclosed in US patent application publications 20020035493 and 20010047264. Yet neither has addressed the issue of how to provide telephone callers with a natural language voice user interface that is both high performance and user friendly. In particular, a major miss from these patents is that they did not address the question of how should the proposed systems enable a telephone user to perform fast and efficient searching in order to find and reserve appointment/reservation of their chosen time. For example, a typical business (such as a physician clinic) has months of appointments data stored in the schedule database. Available time slots are located along a wide spread time line. A simple "bingo play" type of search flow is bound to frustrate a great many users for being slow and unfriendly. Such "bingo play" type of search flow is where the user requests a specific time first. The system then searches in the database to match that request. If the asked time is found, the appointment is set. Otherwise the user is prompted to try another time again and thus repeat the call flow until the user succeeds.

The issue of performance and user friendliness for a natural language voice user interface based appointment/reservation system can also be easily explained by a simple comparison of such a system to the one with a GUI (graphic user interface). A user with GUI can view an entire day's or week's appointment/reservation display at a glance. By pointing and clicking he can quickly navigate between weeks or months schedule displays to find his preferred time slots. A telephone caller, on the other hand, does not have the capability of receiving information nearly as quick. How and what the system should tell the caller becomes very critical in the caller's decision making.

A natural language voice user interface provides information to telephone users in voice; it engages in natural language dialog with the caller and therefore must consider human factors. For example, a system must not be "talking" for too long or else the listener will become frustrated or forget what has been told to him. On the other hand, a system that does not "say" enough to provide sufficient information (such as to inform the caller of the appointment availability) will have high user service failure rate due to lack of information. Furthermore, a user would naturally become very upset when being repeatedly prompted for retry in case of such service failure.

Therefore, in the context of a natural language voice user interface based appointment/reservation system, a high performance voice interface should be able to help a telephone user to quickly find and reserve the available time slot of his preference. A user-friendly voice interface should be able to balance the user-system natural language dialog so as to provide sufficient information to the user to ensure a successful transaction and not to overwhelm him at the same time. To achieve both objects, it is necessary to design a fast database searching algorithm for finding a time slot of user preference and support this searching algorithm with a voice interface that gives full consideration of human factors.

The solution to this issue and to other issues such as system administration by voice commands and new customer sign-up are provided in order to implement a fully voice controlled business scheduling system.

Accordingly, the objects and advantages of the present invention are:

1) To provide a high performance search algorithm supported by a user friendly natural language voice user interface which emulates a human office assistant, where this feature enables a user to quickly find and reserve an appointment/reservation of his preference.
2) To provide a back-up mechanism to a natural language voice user interface to ensure a high service success rate and service quality.
3) To automate new user service sign-up, account creation and account updating via a natural language voice user interface.
4) To automate user appointment/reservation cancellation.
5) To automate an appointment/reservation waiting list via a natural language voice user interface.
6) To automate business schedule administrations via a natural language voice user interface.

SUMMARY OF THE INVENTION

A fully voice controlled business scheduling system is provided. In the preferred embodiment, the system uses ASR (Automatic Speech Recognition), TTS (Text to Speech) as well as VoiceXML to implement a natural voice user interface. It is a virtual administrator that emulates a live office administrator in charge of business schedule bookkeeping.

In one proposed feature, the present invention solves significant problems in the art by combining a high performance searching algorithm with human factors. The search algorithm reduces transaction time by dividing available search time/date range into multiple sub-ranges and performs searching in the sub-range of a user's choice. This algorithm is supported by a user-friendly voice interface that emulates a human office administrator.

According to the system searching methods for selecting available time slots, the present invention is able to select an appointment/reservation time based on the user's preferred date or preferred time of day.

The business scheduling system can be used either exclusively by pre-defined business customers (customers who have existing accounts as is the case for a doctor's office and private sport clubs), or by public (without existing account as is the case for restaurant reservation).

In an exclusive scheduling system, a user's profile needs to be defined and the user may pass an identity validation (with phone number, Social Security Number, or other ASR recognizable information as identification) prior to making an appointment/reservation. While in a system that is accessible to the public, this information can be taken on the fly.

According to the aspects of making an appointment on a preferred date and making an appointment on preferred time of day, to make an appointment, a user simply makes a phone call to the system which emulates a live office administrator for taking appointments/reservation; it asks the user's time or date preference, provides useful hints (such as available search ranges) when probing for the user's response, searches and sets appointments according to the user's voice commands.

According to another aspect of the present invention, to cancel an appointment or reservation, a user simply makes a call to the virtual administrator. Based on the account identity provided by the user, the system is able to find and cancel the reserved time slot for the user.

According to another aspect of the present invention, the inventive system can be used by the public for reservation of events such as a restaurant New Year party. The given example assumes no pre-defined user record in the system; the ASR recognizable information from a user (such as credit card type and number, phone number, total number of people in reservation) can be taken on the fly during the transaction and saved into database.

According to another aspect of the present invention when a user cannot make an appointment/reservation due to availability, he may choose to put his request into a "waiting list". Upon new availability, the system will allocate the newly available time slot to the first-in-line user and notify the user of the waiting status change.

According to another aspect of the present invention, the system provides different help features to users unfamiliar to a voice interface. These features include:
1) To provide help prompts as part of every system-user dialogue in order for users to give on-target answer to system generated questions.
2) To echo a user's input in order to confirm received information and enhance the system's voice recognition accuracy.
3) To use an on-line audio system-user dialogue demo to demonstrate how to use the system's voice user interface.
4) To provide explicit list of choices to help a user make decision.
5) To transfer a user's call to the business office where the user can receive further assistance.

According to another aspect of the present invention, a schedule administrator has to pass a security validation (pass code) in order to gain system access. The schedule administrator may perform the following tasks with voice commands:
1) Check appointment status.
2) Voice dialing the users on an appointment list.
3) Print or fax an appointment list.
4) Block/Unblock an appointment time.
5) Cancel appointments.

According to another aspect of the present invention, the system is capable of initiate automated telephone calls, emails, or other communications to send schedule reminder to users who have made business reservations or appointments.

According to still another aspect of the present invention, the system can be used for new user sign-up or service subscription. It provides a voice recording feature to input information that is not ASR recognizable in order to complete the self service or sign-up. Note that the same implementation techniques can be used in many other business applications including new patient sign-up in medical clinics.

BRIEF DESCRIPTION OF THE DRAWINGS

All drawings are made to describe the preferred implementation of the system.

FIGS. 10A and 10B provide a sequence diagram that demonstrates the different help features that can be implemented to help users who are not familiar with the system.

DETAILED DESCRIPTION OF THE INVENTION

The following sections provide a detailed description of the preferred implementation. The first three sections provide a system overview with the descriptions of its physical components, logical components and the interfaces. The other sections focus on system software structure and detail call flow implementations.

System Overview

Figure 1:
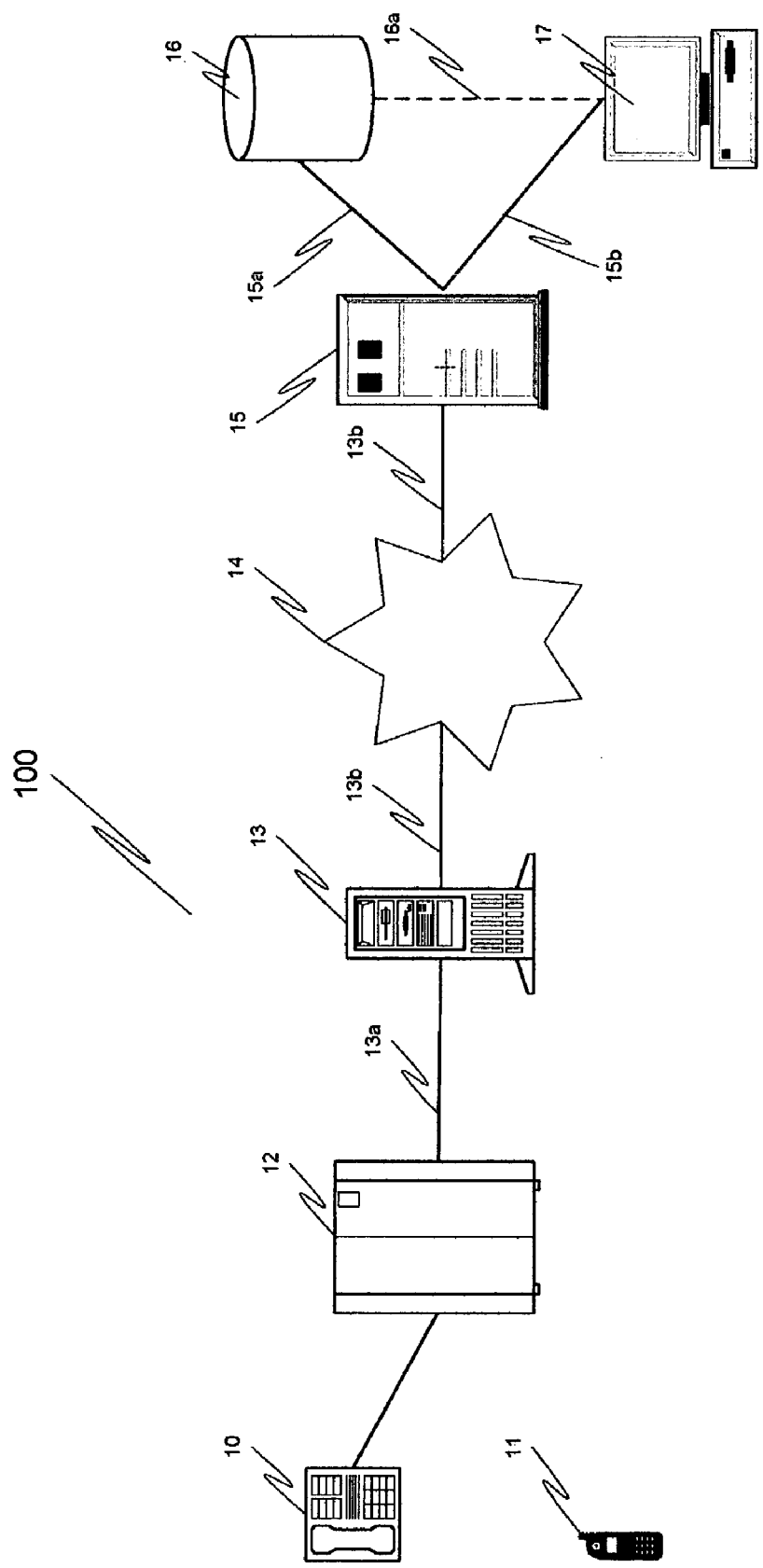
FIG. 1 provides an overview of the system with all physical components.

In FIG. 1, an overview of the inventive system 100 is shown with representative physical components. The system 100 includes an end user terminal in the form of either a wire line phone 10 or wireless phone 11 that are connected to a public switch 12 that serves calls originated from or terminated to these terminals 10, 11.

The public telephony switch 12 connects to a speech server 13 via an interface 13*a*. The interface can be an ISDN PRI (Integrated Services Digital Network—Primary Rate Interface), a VoIP (Voice over IP) based interface, or any other suitable interfaces. The speech server 13 itself acts as a voice terminal to the public switch 12 and it is capable of receiving inbound calls and originating outbound calls.

The major components of a typical commercial (off the shelf) speech server 13 as shown include:
1) ASR (Automatic Speech Recognition) engine.
2) TTS (Text To Speech) engine.
3) ISDN (Integrated Services Digital Network) PRI (Primary Rate Interface), or VoIP (Voice Over IP) interface that supports inbound and outbound voice calls.
4) A VoiceXML (Voice Extensible Markup Language) interpreter or proprietary API (Application Programming Interface).
5) System O&MP (Operation, Maintenance and Provisioning).

A web server may be used as the system's application server 15. This is where the applications software programs are stored and executed. The application programs implement natural language voice user interface, application control logics and database access.

Although not shown, it should be understood that there can also be a web-based GUI (Graphic User Interface) in parallel to the voice user interface. The web-based GUI can be made an integrated part of this system to support same services features (such as make/cancel appointments) provided by the natural language voice user interface. The GUI is particularly effective in schedule database administrations and application parameters configuration.

The speech server and the application server 15 communicate via path 13*b* crossing the Internet 14 using HTTP/HTTPS (Hyper Text Transfer Protocol,/Secure).

More specifically, the speech server 13 downloads static and dynamic VoiceXML pages from the application server 15. These pages are parsed and interpreted by VoiceXML interpreter of the speech server 13 in order to control call flow and user-system natural voice dialogues. Based on application logics, the speech server 13 submits requests, with the collected user data, to JSP (Java Server Pages) on the application server 15. These requests often involve accessing back end database 16. The JSP pages are designed to perform the requested tasks and, based on processing results and the application logic, dynamically generate and send VoiceXML pages back to the speech server 13.

A back end relational database 16 stores data for business schedule, appointment/reservation information, users and administrator profiles. It supports SQL (Structured Query Language) for data query along path 15*a* and 16*a*.

The administration of the schedule data and user information can be done three different ways;
1) From computer 17, via web based GUI (Graphic User Interface) along path 15*b* and 15*a*.
2) From computer 17, via a proprietary interface 16*a* (shown as a dotted link) within private networks.
3) Via a natural language voice user interface. (Shown and further described by FIGS. 11A, 11B, 11C, 11D, 11E and the associated descriptions).

Logical Components

Figure 2:
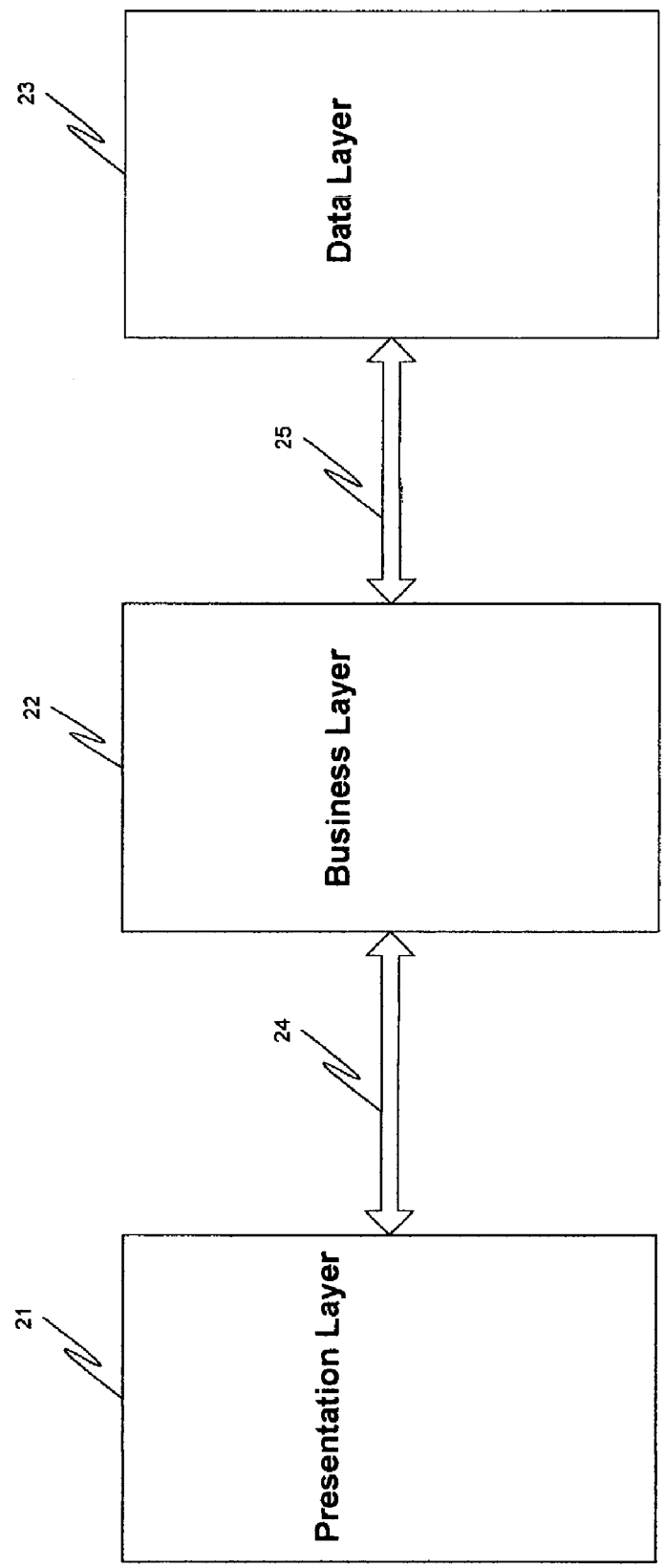
FIG. 2 shows the necessary logical components of the system. It divides the application software into a distributed structure (a three-tier system) that is not only easy to implement, but also best for system performance, scalability and reliability.

In FIG. 2 the system is divided into three logical components 21, 22, 23 and thus is implemented as a typical three-tier web application system. The component 21, representing the "Presentation Layer", maybe a speech server (also commonly called voice browser). The component 22, representing the "Business Layer", may be an application server that controls the application logic. The component 23, representing the "Data Layer", may be a back-end relational database. The communication path 24 may be HTTP/HTTPS. The path 25 may be a path supporting SQL.

Concurrent transaction processing is similar to that of a regular web application due to this structure. Multiple simultaneous user calls (to the same telephone number) can be connected to one VoiceXML page the same way as multiple users visit the same web site. Thus a business can have multiple virtual administrators taking calls from customers. To fully take advantage of this characteristic of resource efficiency, the system can be configured such that multiple businesses share one telephone number for appointment/reservation service as well as a pool of telephone connections to speech server. The system is able to separate and redirect customers easily to the business with which he wish to schedule appointment (example in FIGS. 6A, 6B, 6C).

Software Modules

Figure 3:
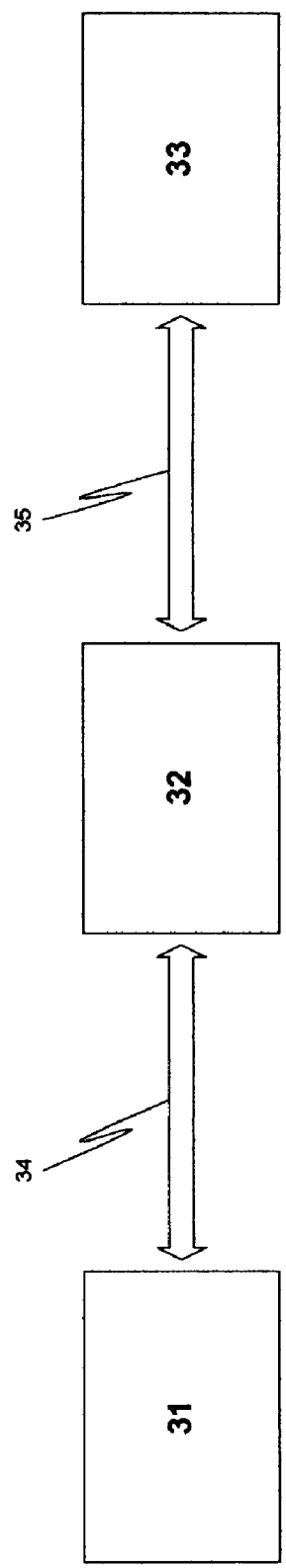
FIG. 3 shows the software components derived from the structure of FIG. 2, the interface between the components, and the programming languages used in these components for the preferred implementation.

FIG. 3 shows the software structure of the implementations. The application software is divided into three program modules 31, 32 and 33.

The module 31 can be a group of VoiceXML pages. These VoiceXML pages are interpreted or parsed by speech server. They are designed to control the system-user dialogues. The VoiceXML pages have two major functions:
1) They collect user voice input that is necessary for a specific task and send the data to the application server.
2) They "speak" to the end user, either to solicit a voice input or to communicate a processing result received from the application server.

The collected user data is sent to the second module 32 that can be a group of JSP (Java Server Pages) pages. In the context of this implementation, the JSP pages are also dynamic VoiceXML pages. The JSP pages receive requests from the speech server. It accesses the database on the back end, depending on the access result and the business logic, dynamically generate and return the VoiceXML page to the speech server.

The backend database is where all data (schedule data, user and administrator profile) is managed and stored. The third software module 33 is therefore a database manager that provides access functions toward the database. This manager provides the interface that manages the database connection, data update, removal, searching, etc . . . For the preferred implementation, the data saved in database include but not limited to:
1) Appointment/Reservation Table: appointment/reservation time slot with time stamp, status (available or reserved), time slot service type (which may also be used to determine the duration of reservation), appointment alerting indicator (used to determine whether or not a reminder is to be sent to the customer), ID of customer who take the appointment/reservation.
2) Customer Profile Table: customer ID, customer name, contact information, alerting address (telephone, email, or mobile short message)
3) Administrator profile Table: administrator ID, administrator name, PIN number or voice password phrase, contact information, alerting address (telephone, email, or mobile short message), schedule configuration parameters, maximal allowed retry in failure handling.
4) Waiting List Table: customer ID, waiting line priority order, time slot being requested.

The administrator's profile and system configuration are set prior to service start via system administration interface (GUI based, web accessible or in a private network).

A user's accounts and profile needs to be set prior to service if a system serves existing business users only. In this case the user's identity needs to be validated based on the user account information prior to a service.

Figure 12A:
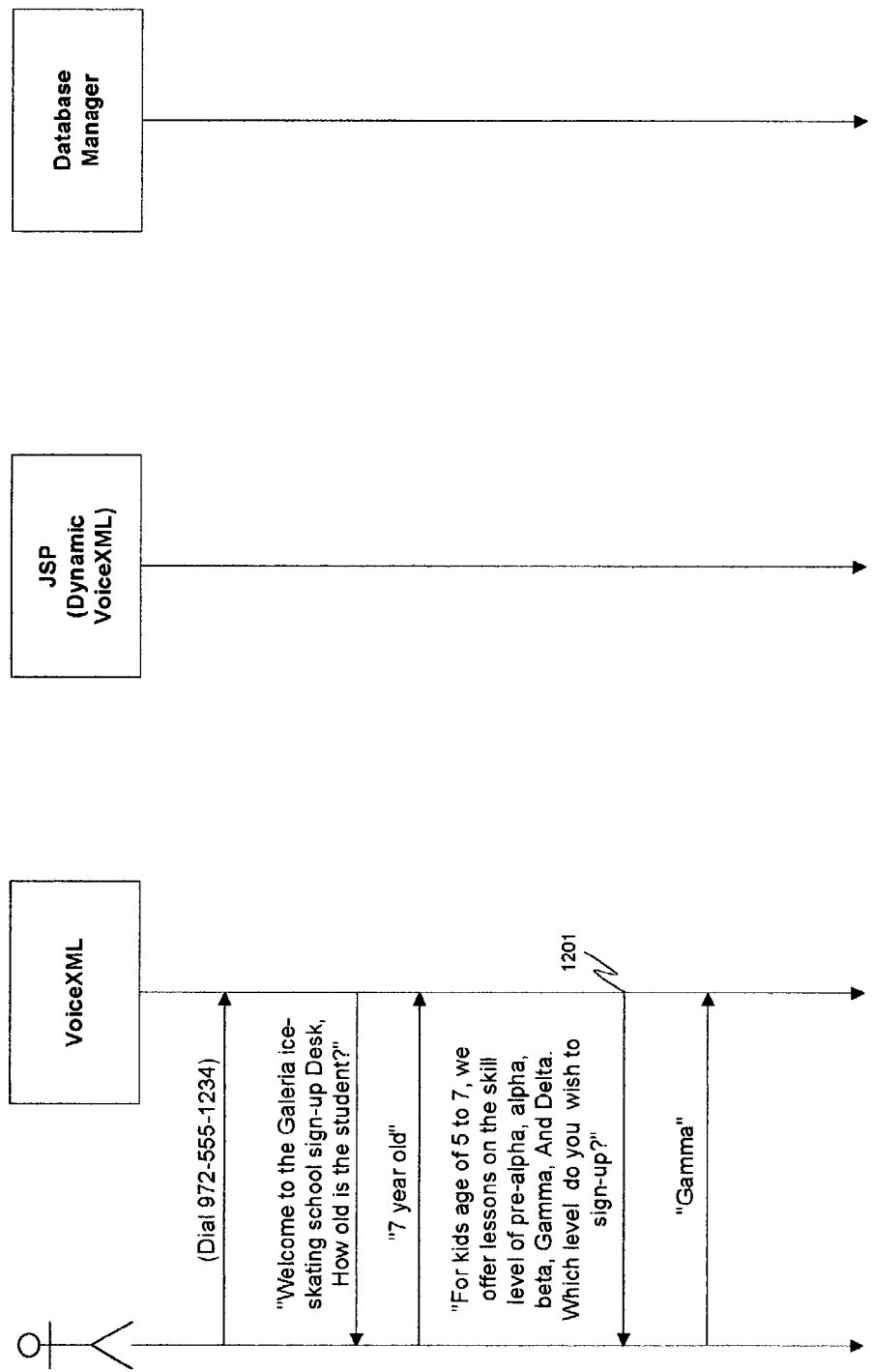
FIGS. 12A and 12B provide an implementation sequence diagram of a call flow for automated sign-up of a business service. It allows the sign-up user to provide information that is not ASR recognizable by means of a voice recording.
Figure 12B:
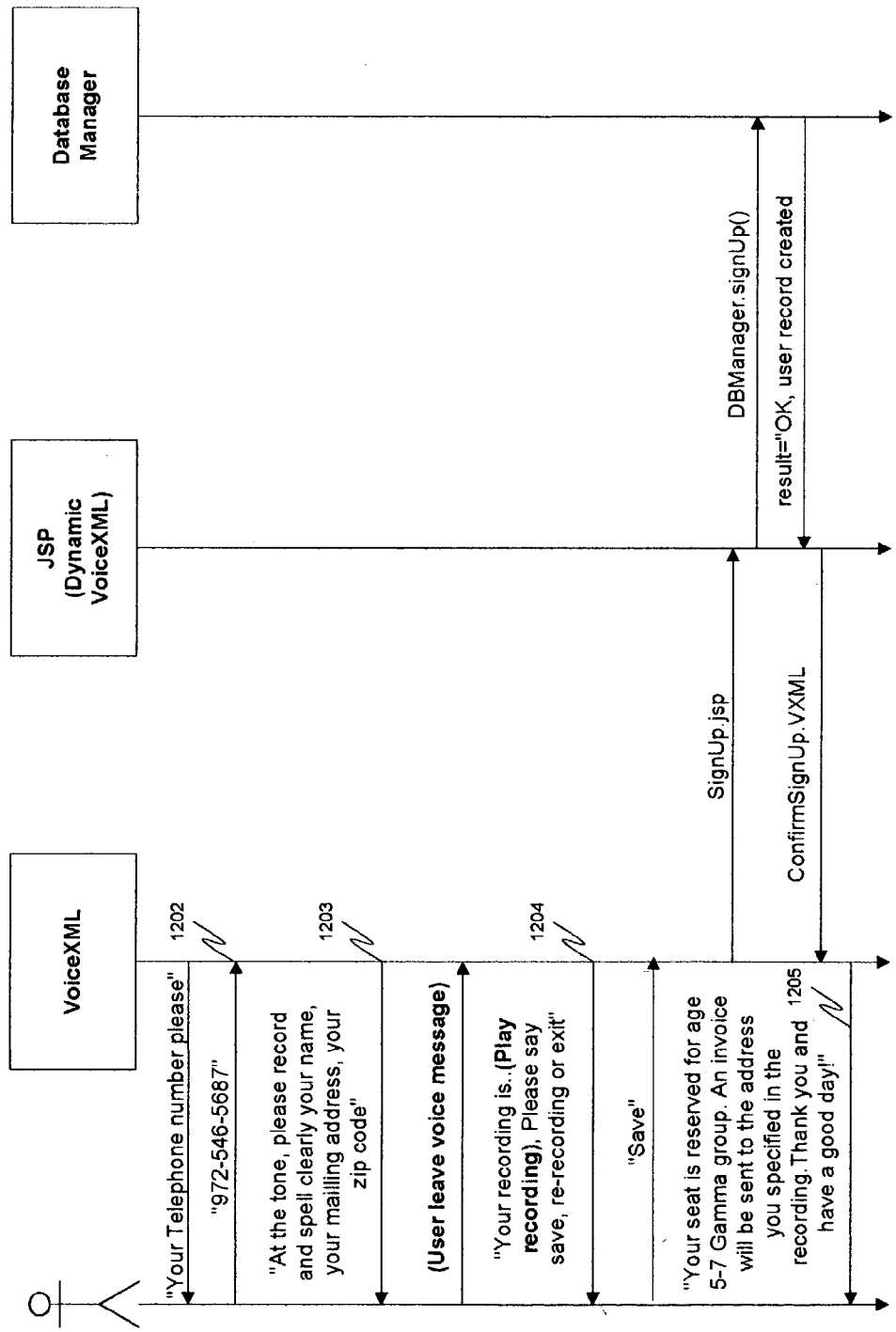

Otherwise if the system is to serve both new and existing business users, a new user's profile may be taken on the fly and a new user account may be created when the service request is received (See example shown in FIGS. 12A and 12B).

The communication path 34 can be HTTP/HTTPS. The path 35 can be a Java API (Application Programming Interface).

With these three software modules 31, 32, and 33, a typical call flow implementation goes through the following sequence;
1) A user makes a call and is connected to the speech server.
2) From module 31, a VoiceXML page "speaks" on behalf of system. It greets the user and asks questions in order to collect needed information to further execute the task. User answers the question to provide user input.
3) Once voice data is collected, the module 31 VoiceXML page submits a request with the collected data to a JSP page in the module 32.
4) The JSP page of the module 32 performs a database access with received data through the module 33. Based on the database access result returned by module 33 and business logics, it then generates and returns a VoiceXML page to the module 31.
5) In the module 31, the VoiceXML page is parsed and the processing result is communicated to the end user with natural voice.

The system-user natural language dialogue may continue by repeating the steps 2–5 until a call flow is completed.

Voice User Interface Error Handling and Help Features

For any given dialogue in a natural language voice user interface, exception events <No Input>, <No Match> and <Help> are possible and require error-handling implementation.

<No Input> occurs when the system asks a question and receives no user response within a pre-defined time.

Voice user interface uses speech recognition grammar to define and recognize expected user speech input. The <No Match> event occurs when ASR cannot match an input speech with any predefined grammar.

The <Help> event occurs when system detects conditions requesting helps to be provided to a user.

Figure 10B:
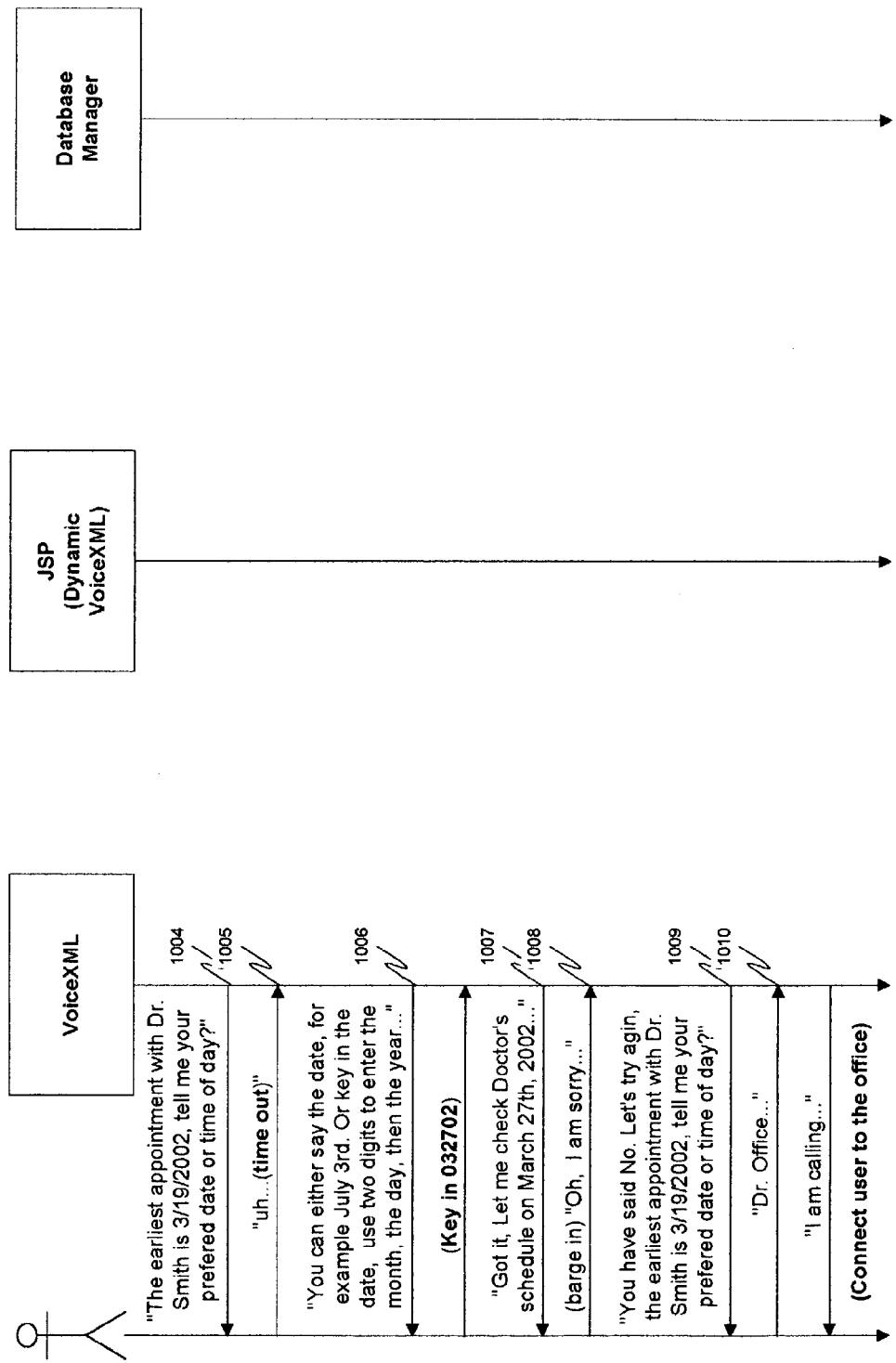
Figure 11A:
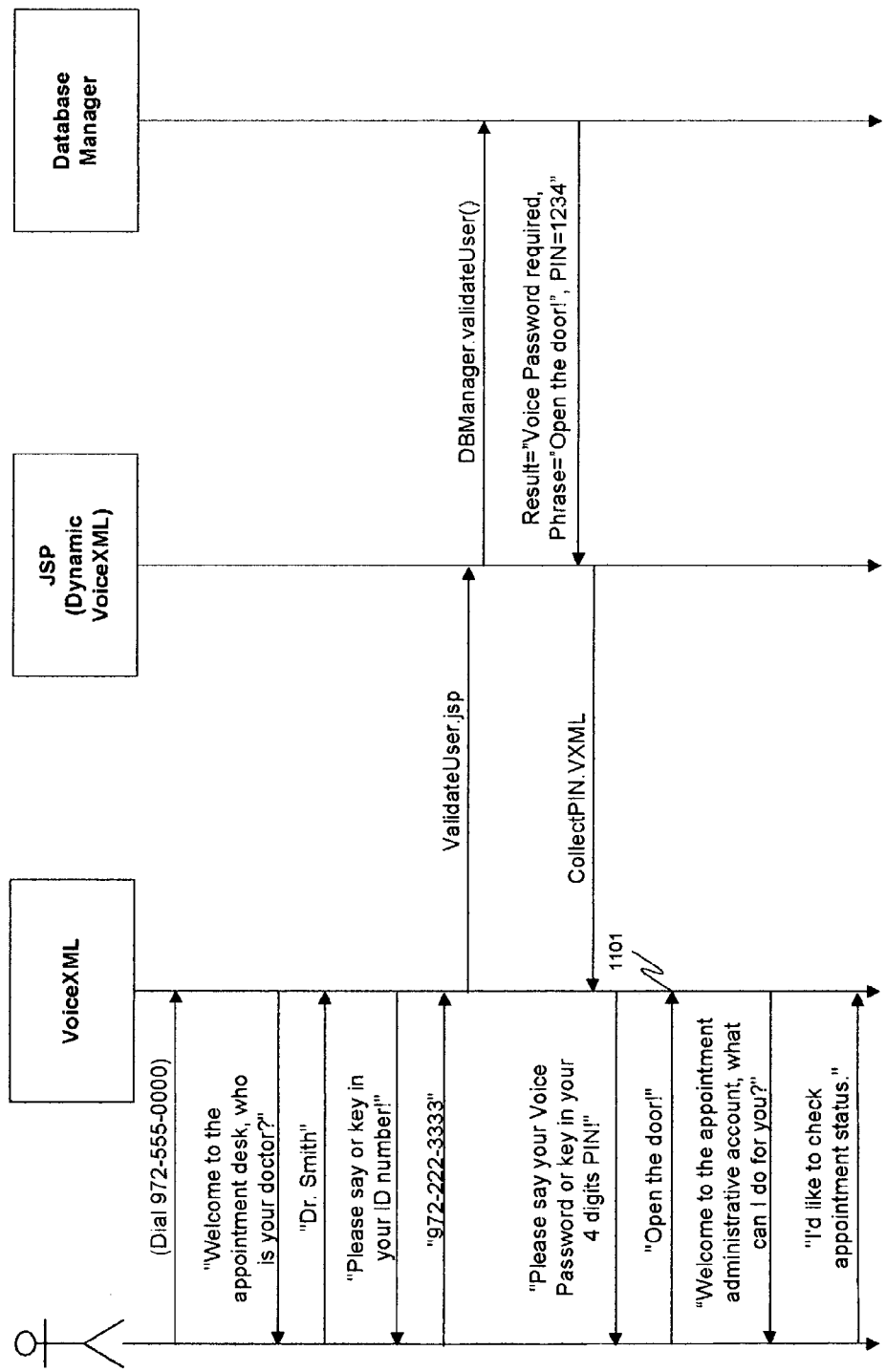
FIGS. 11A, 11B, 11C, 11D, and 11E provide an implementation sequence diagram of a call flow in which a schedule administrator performs multiple administration tasks by voice commands in one telephone call.
Figure 11B:
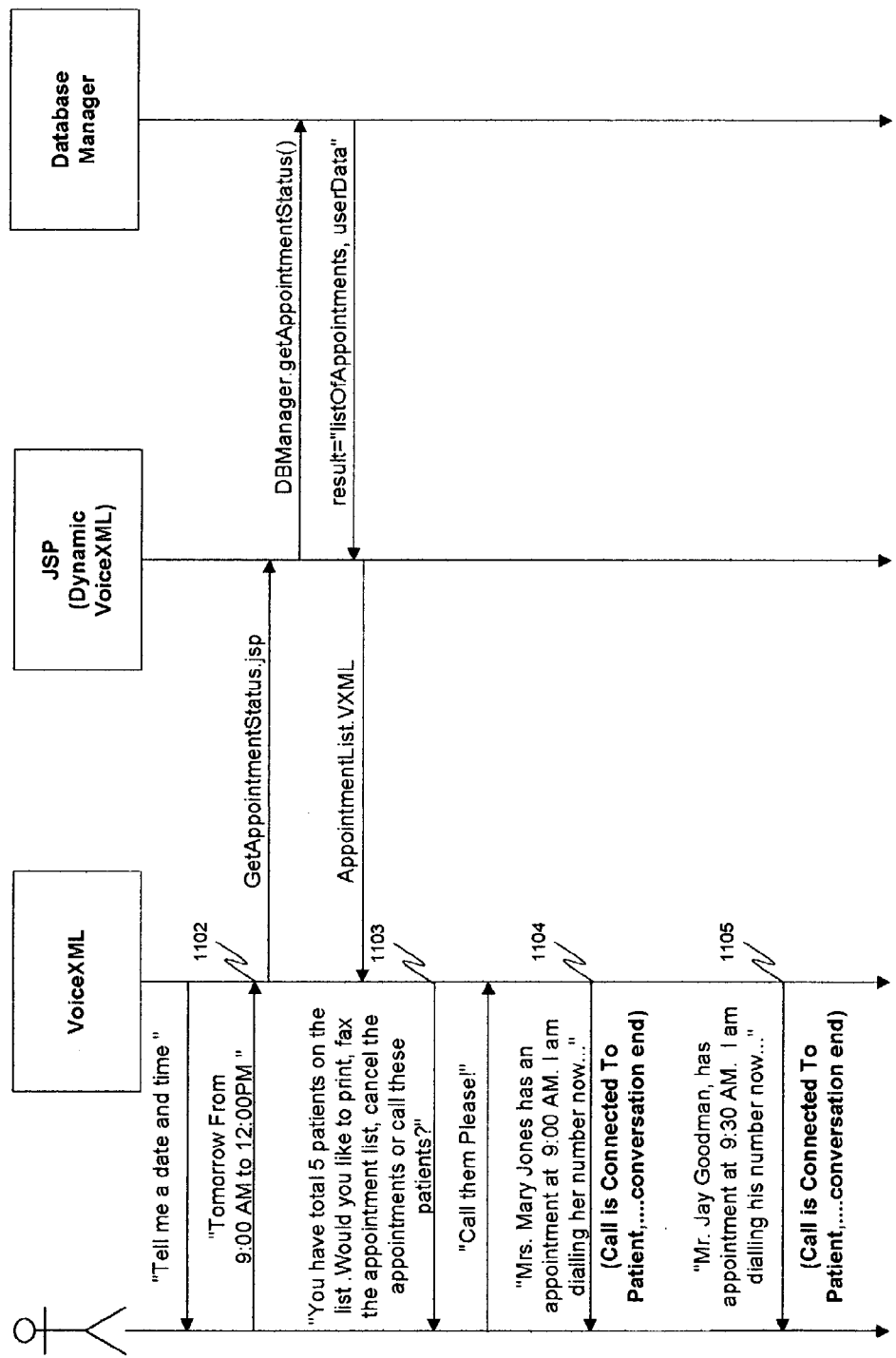
Figure 11C:
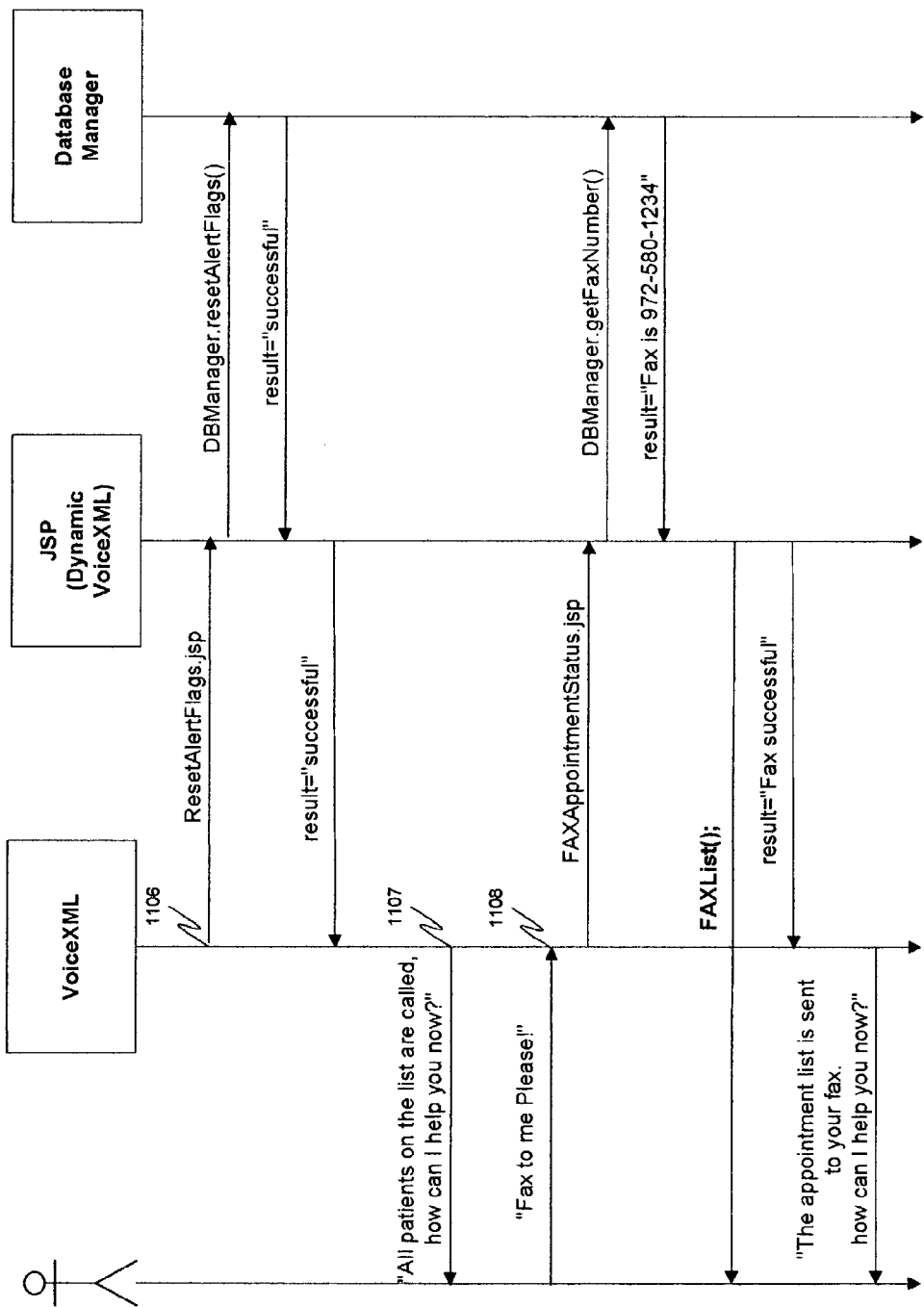
Figure 11D:
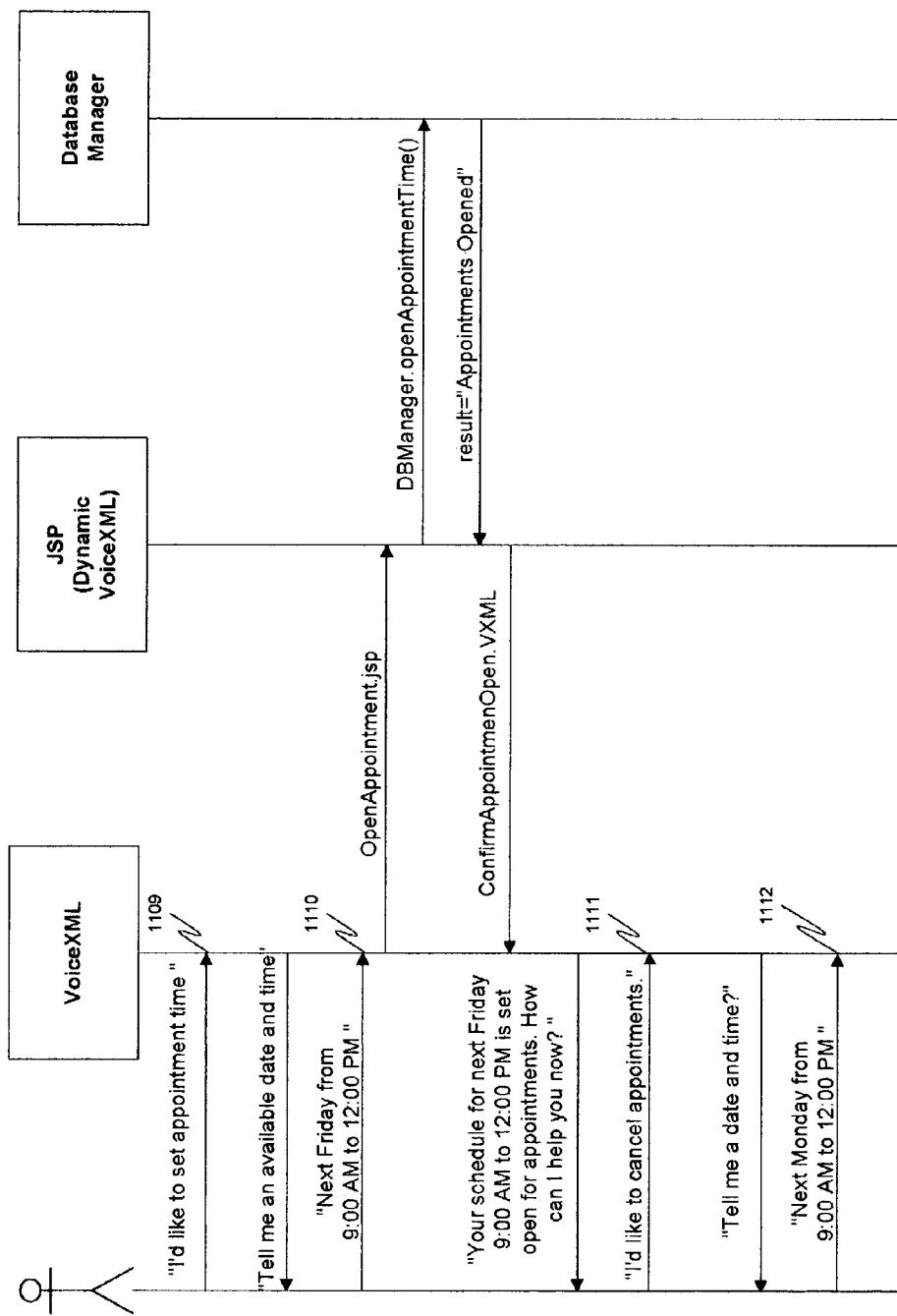
Figure 11E:
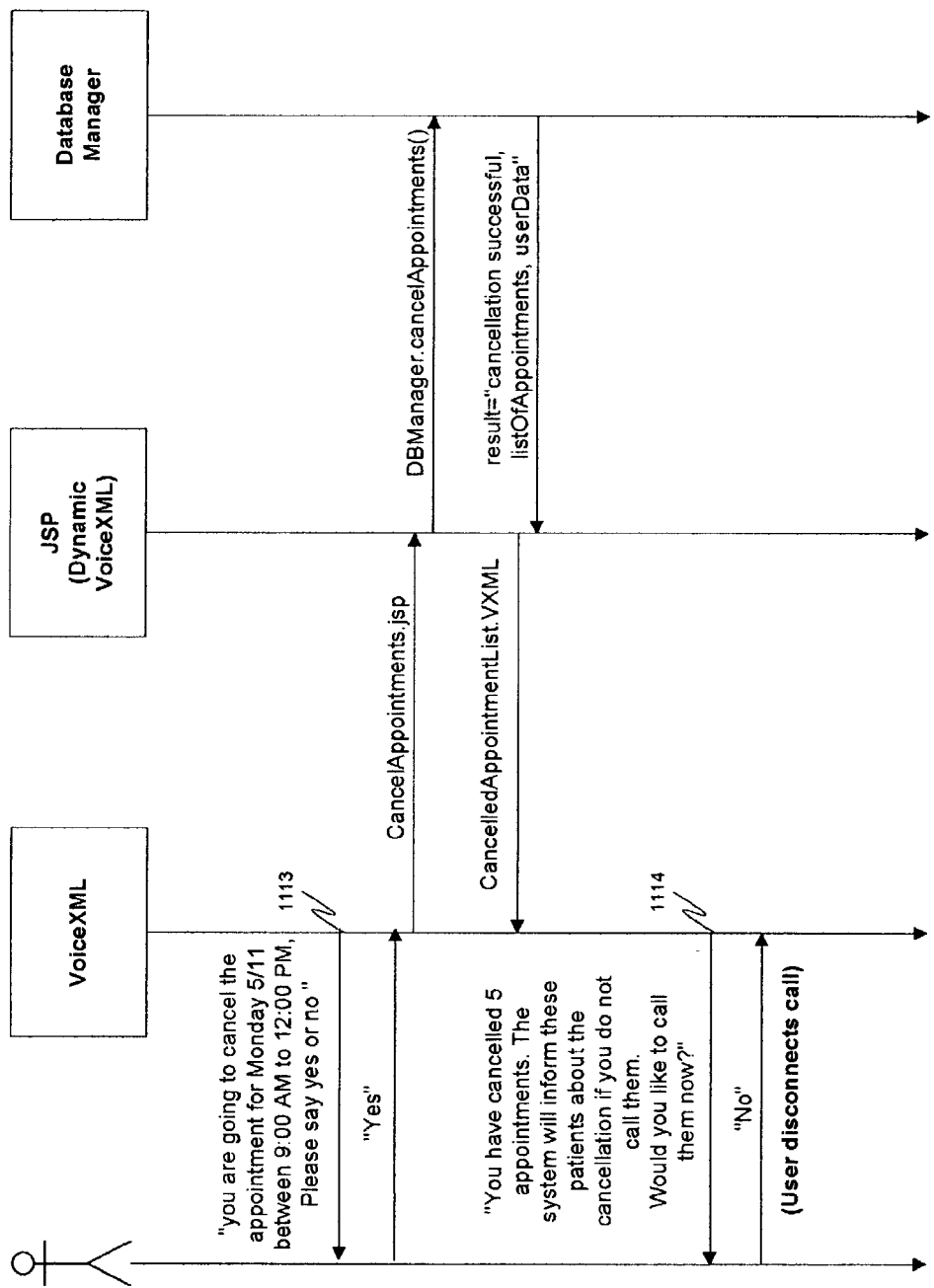

The techniques used in the preferred implementation for these events handling are illustrated in the example of FIG. 10A, and FIG. 10B. The techniques include:
1) Re-prompts the question (shown in step 1004, 1009).
2) Provides example or hints to user for "on-target" answer (shown in step 1006).
3) Help user by explicitly enlisting all choices or the expected responses for a question (shown in step 1002).
4) Suggest and accept touch-tone DTMF key input instead of voice input (shown in step 1006).
5) Play demo dialogue recording to demonstrate to user how to search and reserve an appointment successfully (shown in step 1002).
6) Transfer user's call to the business office for a live administrator assistance (shown in step 1010).

System Searching Algorithm for Selecting Available Times Slot

All time slots stored in scheduling database are initially blocked and not available for booking. Scheduling database administrator must unblock these time slots by specifying the business hour available for appointment/reservation and the appointment minimal interval (such as 15 minutes, this can be changed based on business need). This will cause the business hours to be divided into available time slots. Each slot has a time stamp and a status indicator showing whether or not the time is taken. The searching algorithm presented in this section includes two methods for available time slots search and selection based on a user's preference.

As all services do not need same amount of time, the searching algorithm also assumes that the duration of the appointment has already been determined prior to searching. The duration can be determined by system configuration (use default setting) or by user-system dialogue/negotiation (the system may determine time needed for service based on the type of service requested). The system may search and reserve multiple continuous available time slots if one is not sufficient.

The system-user dialog structure which supports the search algorithm comprises the following basic steps, these steps can be repeated in searching iterations (initial or retry) until either a user find a match or call flow ends on exceptional conditions.

1) The system presents to the user at least one available search range and optionally requests the user to select one. For example:
(Statements guiding to a subsequent search on the entire available range)
"The earliest appointment with doctor is on March 31".
"There are appointments available from July 8th until December 20th".
(Questions requesting the user to select a specified available range)
"Would you like to come on the week of March 24th, April 3rd, or April 10th?"
"Would you like to come in the month of May, or June?"
"How about the morning/afternoon of next Monday, March 31?"
"Would you like to come on next Friday September 27?"

2) The system presents to the user search options to collect the user's choice. The options includes search on preferred date, search on preferred time of day, or earliest possible. The system will also collect the user's time or date preference required by the selected option (no time or date preference is asked of the user if the search option is for earliest possible). For example:
(Statements presenting to the user search options to collect the user's choice)
"Tell me your preferred date or time of day".
"I can search appointment openings close to your preferred date, your preferred time of day, or the earliest. Please say 'search on date', 'search on time', or 'the earliest'",
"Tell me a time, for example, 8 AM".
In return, the system expects a typical response from the user to provide preference such as:
"Next Friday, please!"
"9 o'clock!" or "Friday at 9:00".
"September $7^{th}$"
"early next month, in the morning"
"The earliest possible!"

3) The system searches in scheduling database by applying selected option and preference within the selected search range. If no time slot is found, the system will restart searching by asking the user's preference again.

4) To avoid overwhelming the user with too many choices, the system may optionally apply a process that uses configurable "window" or a maximal number to select the found available time slots most close to the user's preference. The system then presents to the user these slots and requests the user to make a selection.

5) If the user accepts a time slot, the system reserves that slot in scheduling database for the user. Otherwise if no slot is accepted, the system will restart searching by asking the user's preference again.

A user may not find a satisfactory time slot after a few searches based on his preferences. A configurable parameter defining maximal searching retries is used to determine if the system-user dialogue should be terminated by applying "Last Option."

Maximal searching retries is used to avoid searching deadlock, which may irritate users psychologically. "Last Option" is the process that the system applies when user exceeds maximal retries. In a preferred implementation, similar to that shown by FIG. 10B, step 1010, the "Last Option" may be to transfer user's call to the business office where the user will receive further assistance. Another alternative is to play a message to the user to suggest a different service solution (for example, announce a system error message and provide another number to call).

Select Available Time Based on User's Preferred Date

Figure 4:
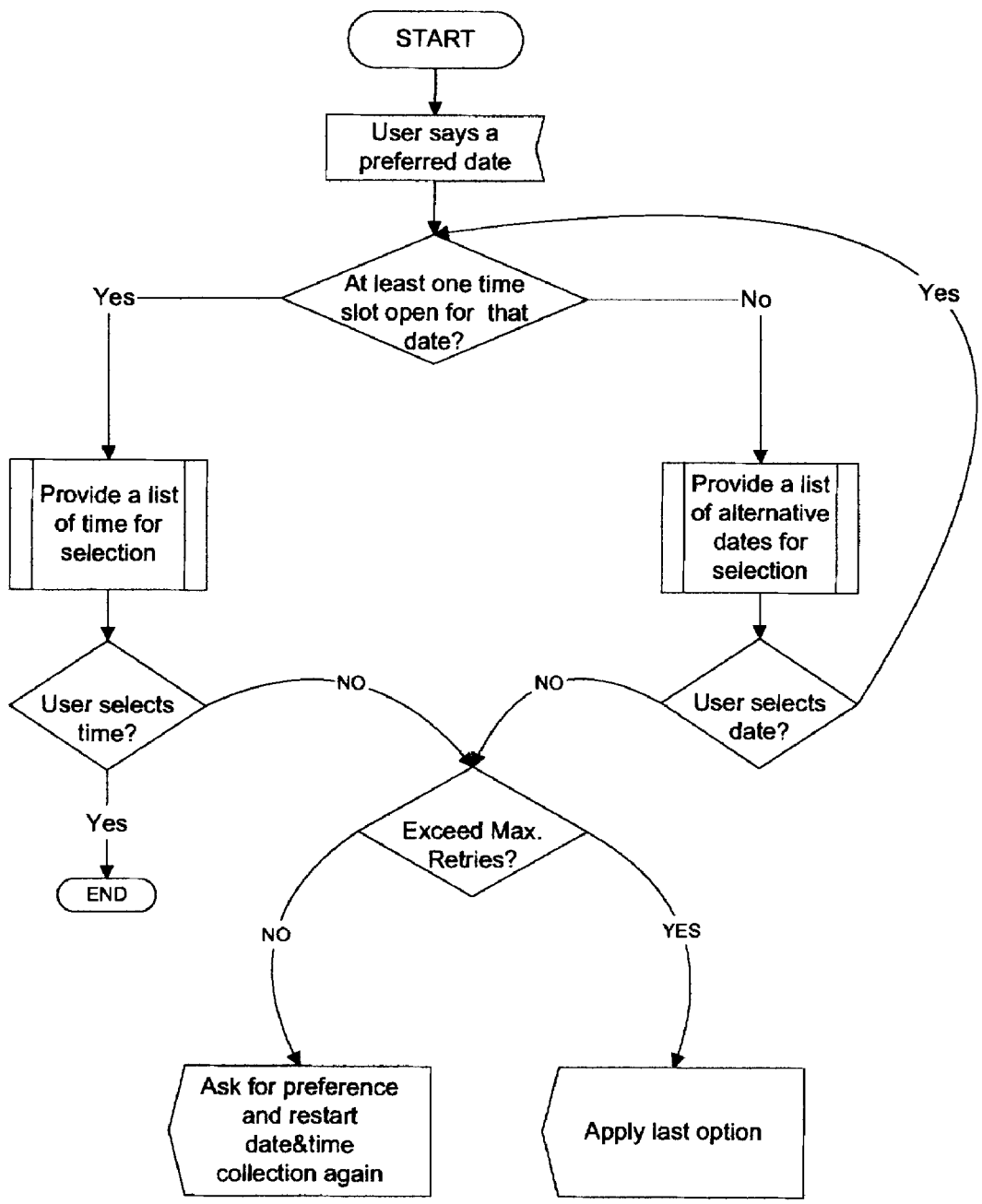
FIG. 4 is a flow chart that illustrates the available appointment/reservation time slot selection method based on user's preferred date.

This method is illustrated by flow chart in FIG. 4. The method assumes the available search range has been selected. When a user says a preferred appointment/reservation date, the system makes a search to determine if at least one time slot is available for that date. The found time slots list is offered to the user for selection.

If the user selects an offered time, the system makes a confirmation of the time and date. It then saves the appointment/reservation data for the user.

If none of the time on the list is selected, the system will ask the user for a different preference and restart the search process.

When no available time is found on the preferred date, the system searches for alternative available dates that are close to the preferred date.

To avoid overwhelming the user with too many time slots, a criterion is optionally applied to determine how "close" the alternative date must be to the preferred date (example, list of dates within one week "window" to the preferred date, or a configurable number of most close matches).

If at least one alternative date is found, the system offers the dates to the user for selection. If the user does not select any of the alternative date the system will ask the user's preference again and restart the search process.

When the total number of retry exceeds a predetermined allowed maximum, the system may apply the last option.

Note that each time a user is offered a list of available dates, times, or available search ranges, he becomes better informed on availability and thus becomes better "trained" on picking his next preference. His next selection is more likely to be on target than his last try. The searching algorithm is designed such that his chance to succeed in making an appointment/reservation should improve with each new iteration.

Select Time Based on User's Preferred Time of Day

Figure 5:
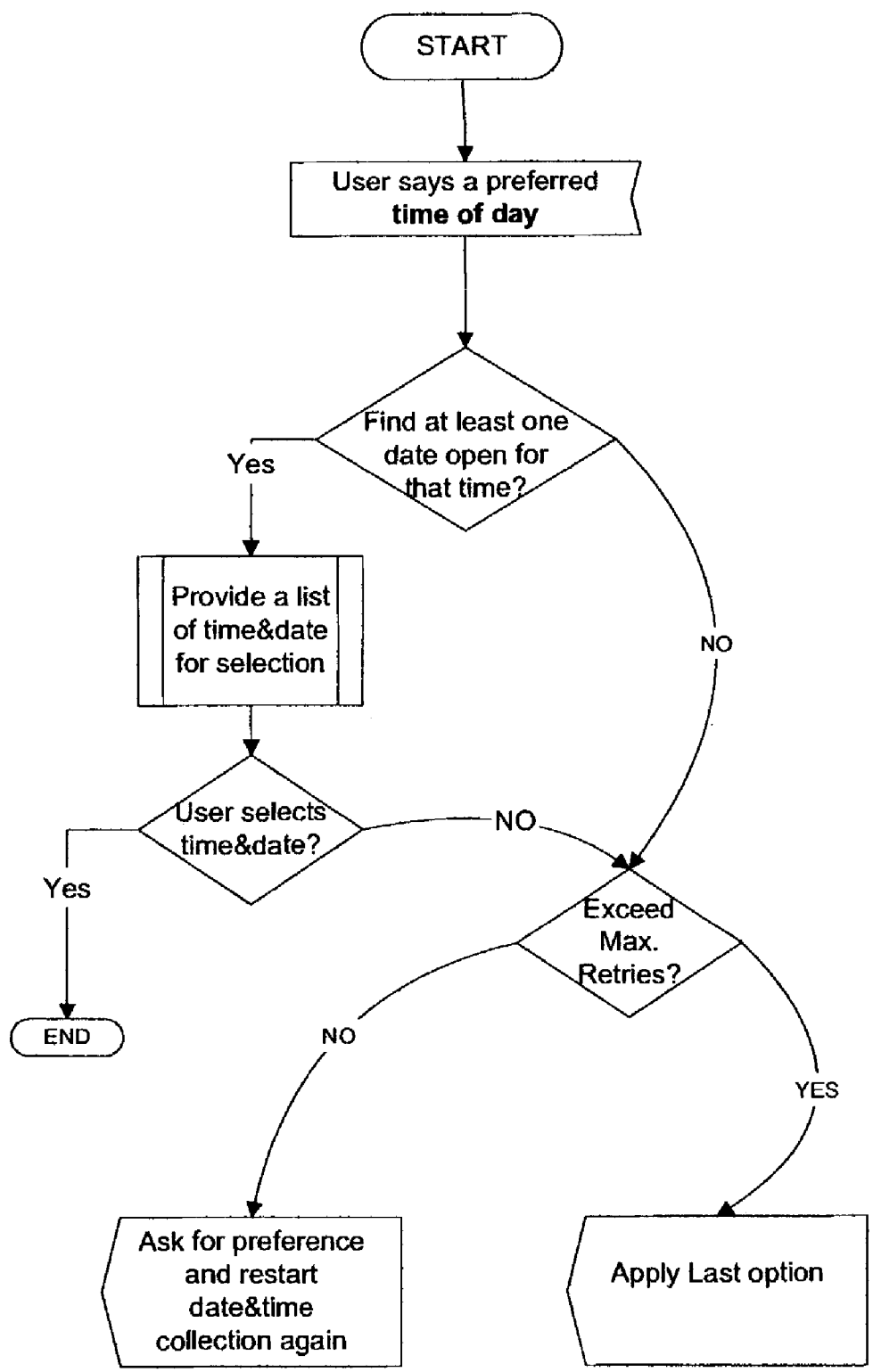
FIG. 5 is a flow chart that illustrates the available appointment/reservation time slot selection method based on user's preferred time of day.

This method is illustrated by flow chart in FIG. 5. It assumes the available search range has been selected. This process starts when a user says his preferred time of day (example, "around 8 AM"). The system searches for a list of dates that have available time slot around that time.

If no available date with preferred time is found, the system will ask the user's for a different preference and restart the search process. Otherwise, the system offers the found list of dates and time combinations to the user for selection.

If the user selects a time and date, the system makes a confirmation of the time and date and reserves the time slot for the user.

If none of the time slot on the list is selected, the system will ask the user for a different preference again and restart the search process.

To avoid overwhelming the user with too many time slots, a criterion is optionally applied to determine how "close" the selected time slots must be to the preferred time (example, within half an hour "window" of 8:00 AM, or a configurable number of most close matches).

When the number of retry exceeds a predetermined allowed maximum, the system may apply the last option.

Service Appointment/Reservation by Group

Some businesses may offer service to group of customers (such as restaurant reservations, group lesson for sport, etc . . . ). The schedule data is handled essentially the same way except the system accepts more than one customer per appointment/reservation. In addition to the schedule data defined for one-on-one appointment, an extra parameter is needed to control the maximum number of customer that a particular time slot may accept. For example, if the maximum number of customers a tennis lesson can accept is 8 persons for the 10:00 AM class, then the system may accept calls for class reservation until total reservation reaches 8 persons.

Figure 8A:
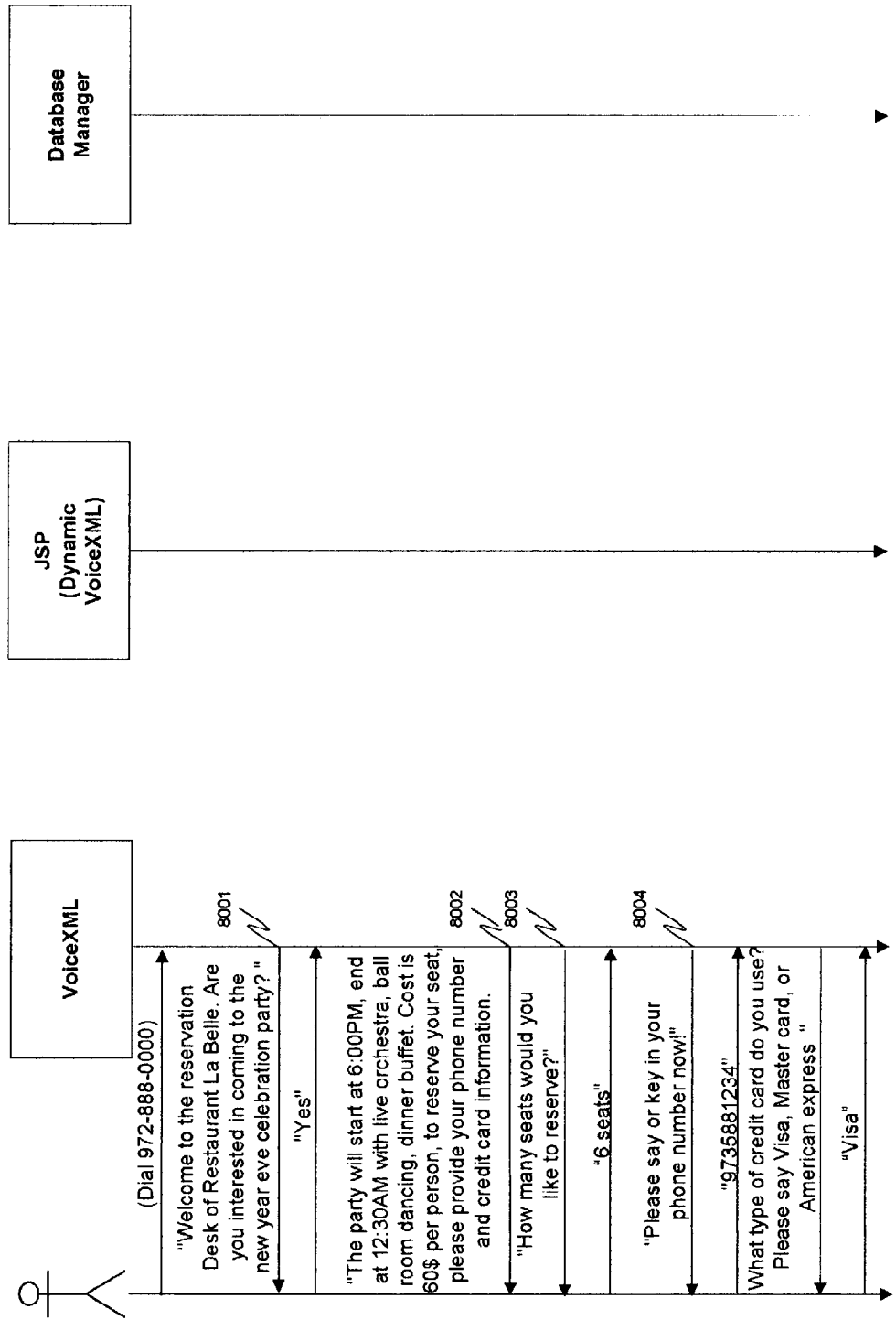
FIGS. 8A and 8B provide a complete implementation sequence diagram of a call flow in which a user makes a reservation at a restaurant.
Figure 8B:
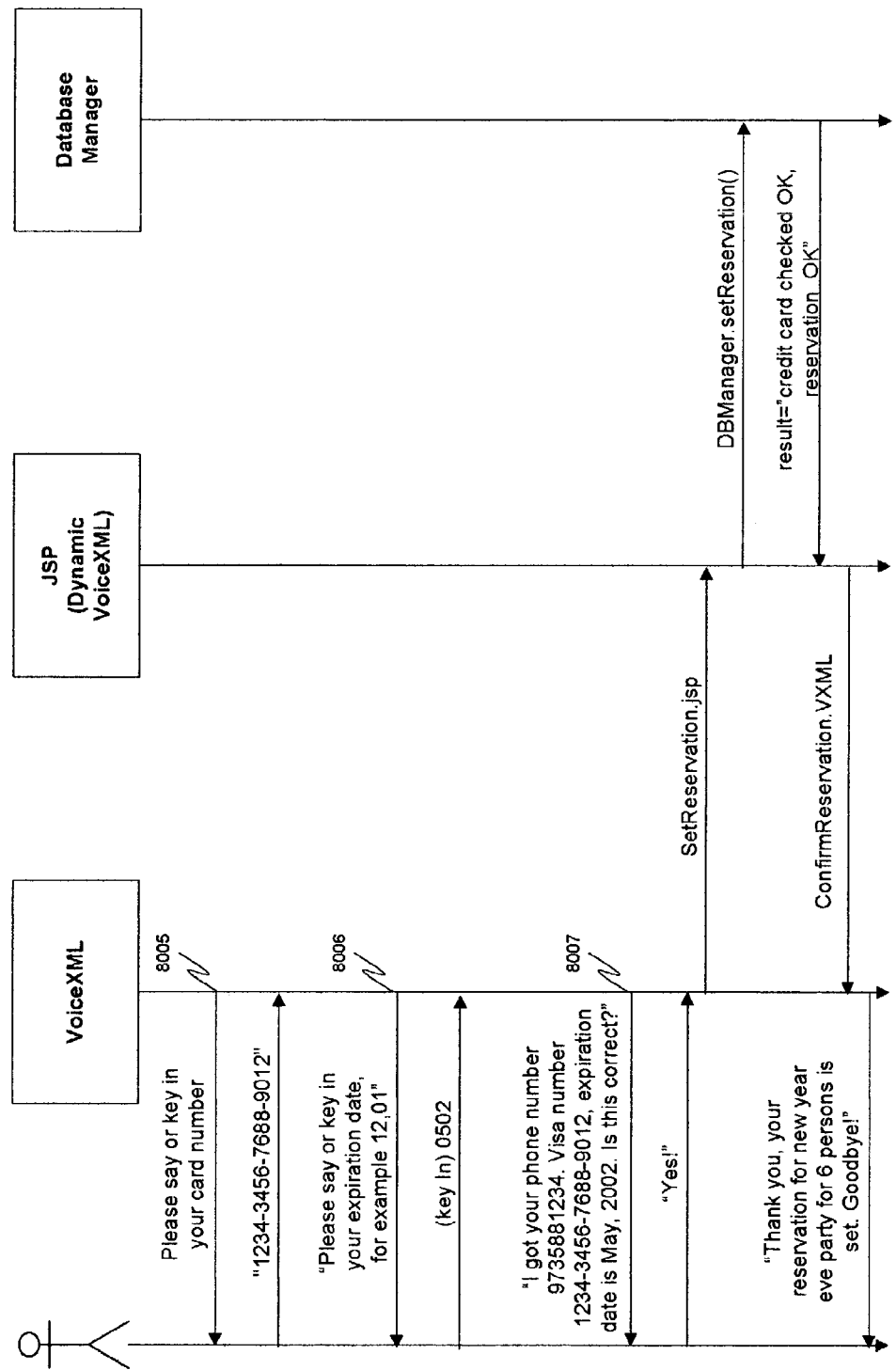

The call flow of FIG. 8A and FIG. 8B, "Restaurant Reservation" illustrates such an example of group reservation.

Implementation Descriptions

This section presents implementation examples by way of sequence diagrams of some major call flows. These call flows are selected to illustrate basic concepts of the present invention although variations within the intended scope of the present invention are possible.

A "User" symbol is used to represent the caller or system user. Natural language dialogue is used to describe the interactions between user and VoiceXML pages. This is to reflect the fact that the VoiceXML pages that are parsed and interpreted by the speech server, are the controlling software that "listen" and "speak" to user.

To reflect accurately the interface between the three software modules 31, 32, 33 in FIG. 3, in all of the implementation sequence diagrams, the name in the format of <programName.jsp> is used to represent a request or a call to the module 32 that may contain JSP pages. The name in the format of <programName.VXML> is used to represent the VoiceXML page of module 31 that is either static or generated by the JSP module. The name in the format of <DBManager.methodName( )> is used to represent a call to the database manager of module 33 for database access.

Figure 6A:
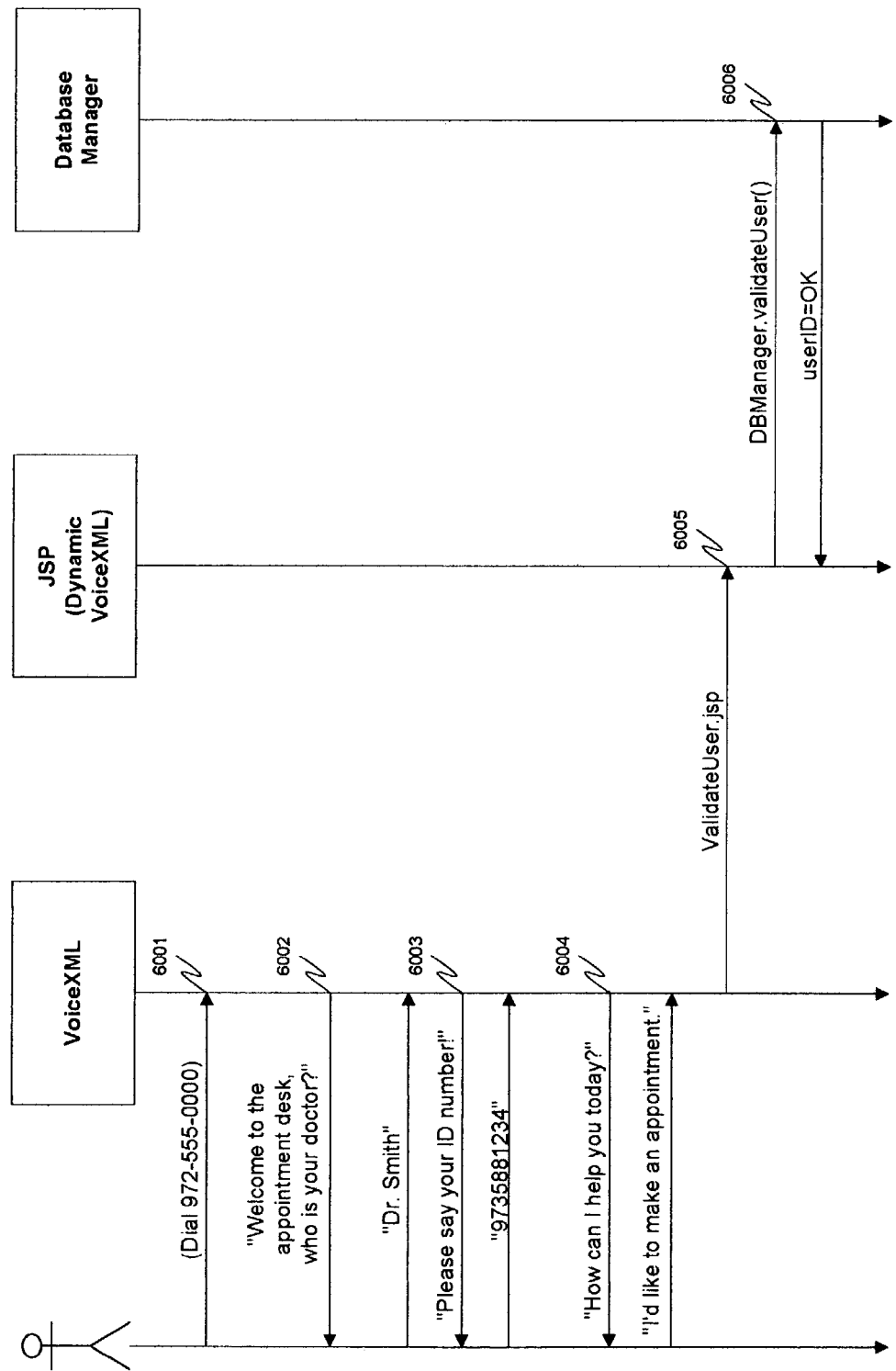
FIGS. 6A, 6B, and 6C provide a complete implementation sequence diagram of a call flow in which a user makes an appointment based on his preferred date.
Figure 6B:
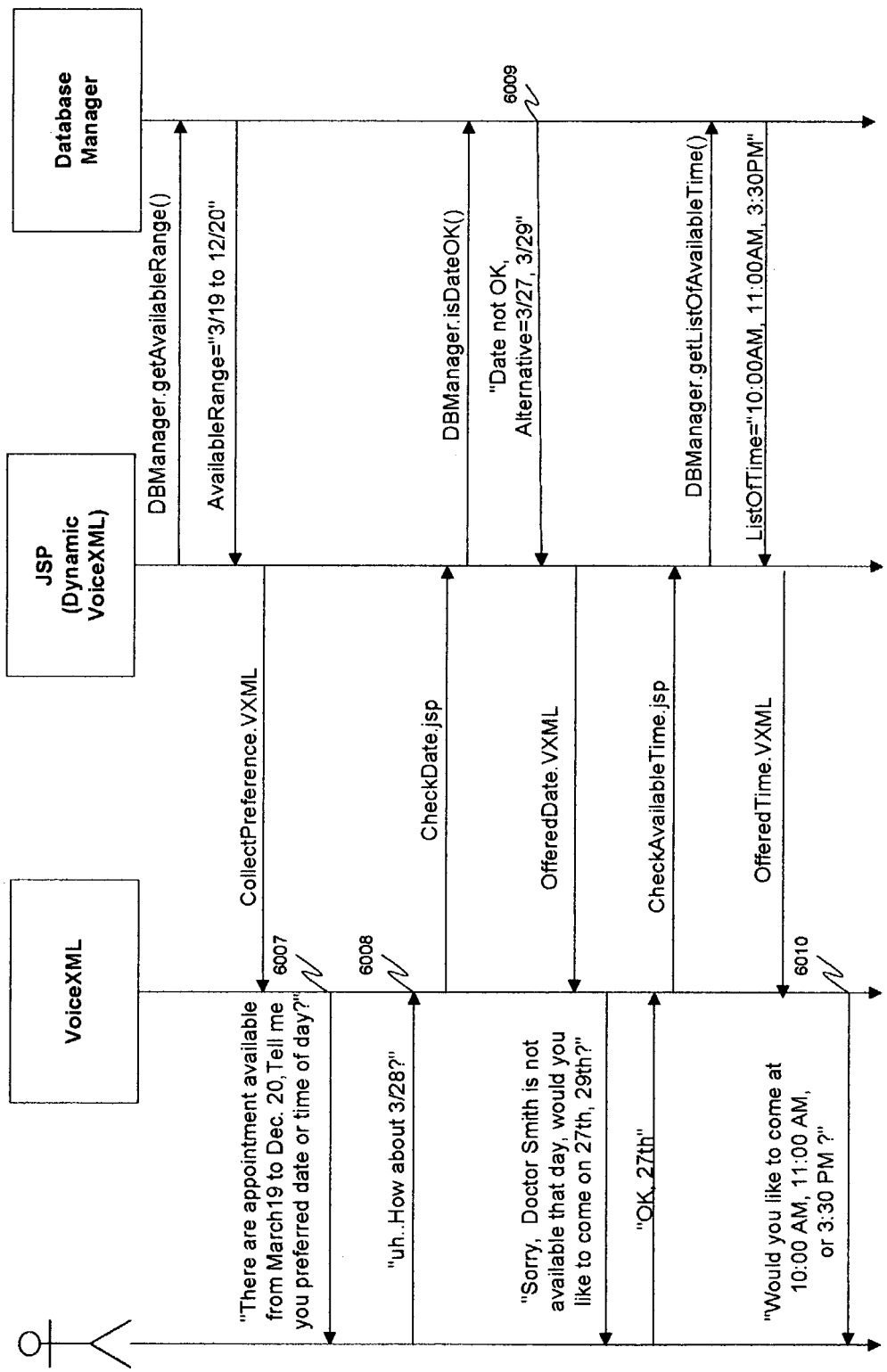
Figure 6C:
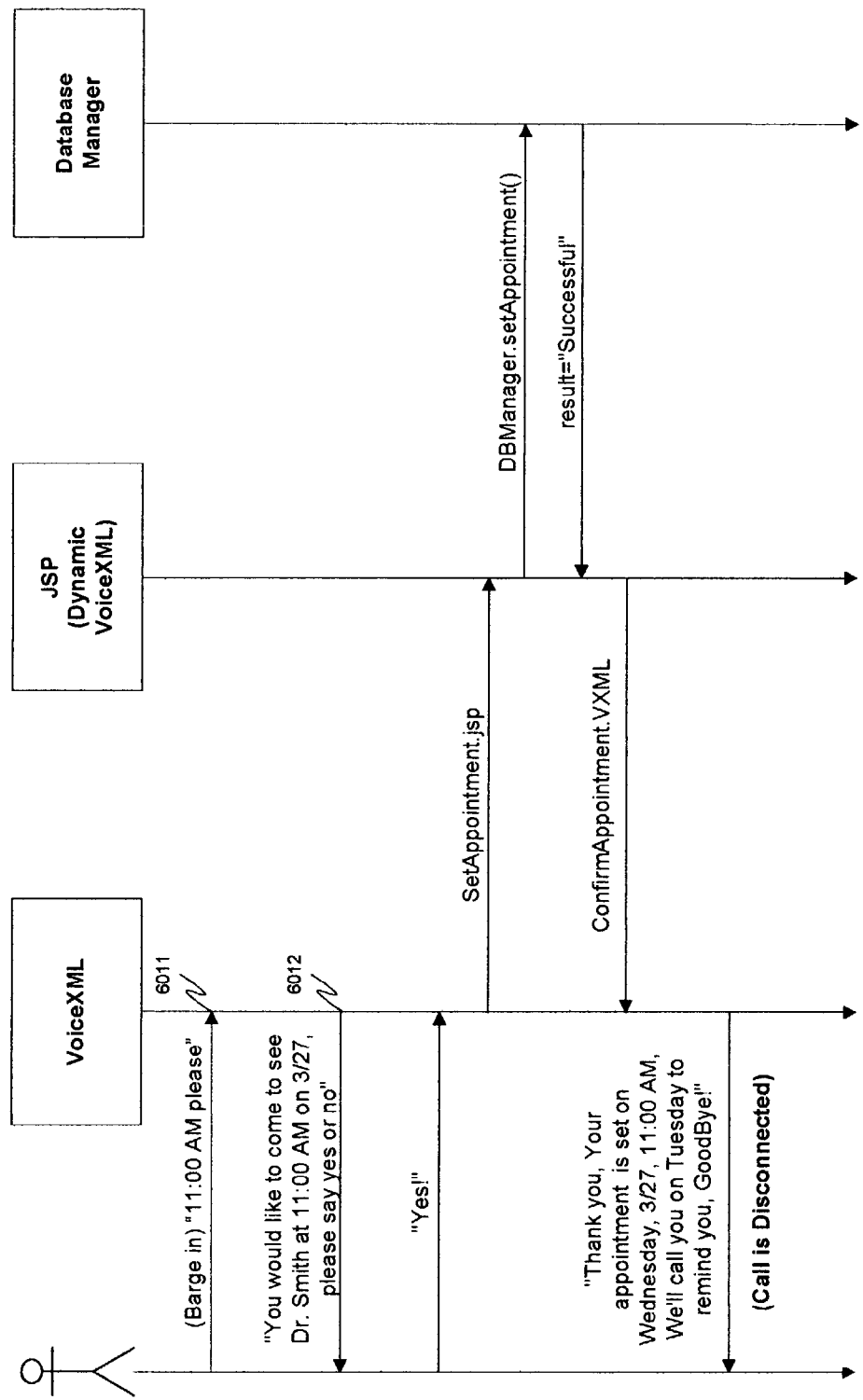

Call Flow of "User Makes an Appointment on Preferred Date", FIGS. 6A, 6B, 6C

In this call flow implementation illustrated by FIGS. 6A, 6B, and 6C, an appointment is made by a user based on his preferred date. The example applies for a case in which multiple doctors share one appointment telephone number and the automated appointment service can only be used by a doctor's existing patients who have user profile data stored in the system.

Step 6001: A user makes a call to a number assigned for appointment/reservation line. This call connects the user to the first VoiceXML page for the appointment service and starts the system-user dialog.

Step 6002: The appointment phone number is shared by more than one doctor in this example. The system needs to know with whom the user wishes to make an appointment.

Step 6003: In this example, the automated appointment line is made to serve only the doctor's existing patients (new patient appointment is usually processed directly by the physician office and requires office administrator attentions). Therefore the user's ID is collected for access validation.

Step 6004: This step probes the user for appointment service type. The user can make/check/cancel an appointment.

Step 6005: VoiceXML page calls the JSP page <ValidateUser.jsp> to validate the received user ID.

Step 6006: The JSP page accesses the backend database via DBManager by calling <DBManager.validateUser( )>. Another access to the backend database is also performed to obtain available search ranges.

Step 6007: Based on the result from the database access and the application logic, the JSP page dynamically generates and returns a VoiceXML page <CollectPreference.VXML> to speech server. This page presents to the user available search ranges and collect the user's preferences.

Step 6008: The user provides his preferred date.

Step 6009: The DBManager searches for the available time slot on the preferred date, when no available time is found, it provides a few alternative dates that are close to the user's preference (Refer to section "Select Available Time Based on Preferred Date").

Step 6010: For a selected date, a request is submitted to a JSP page. DBManager is called to search for a list of available times. The search result are enlisted in the dynamically generated VoiceXML page <OfferedTime.VXML> for the user to select.

Step 6011: The user "barges in" on the system prompt to make his time selection. Note that "barge in" is an speech server feature. It allows the user to interrupt or talk over an audio prompt by system.

Step 6012: The system echoes the user's date/time selection and requests a confirmation before storing the information into the database. The confirmation technique is designed to eliminate any selection error (mistake made either by the user or by ASR). In this case, the user may be given another chance to reselect a time if a mistake is made.

The system stores appointment data upon the user's confirmation. Otherwise, if no time slot is chosen, the system will ask the user for a different preference and restart the search process.

Figure 7:
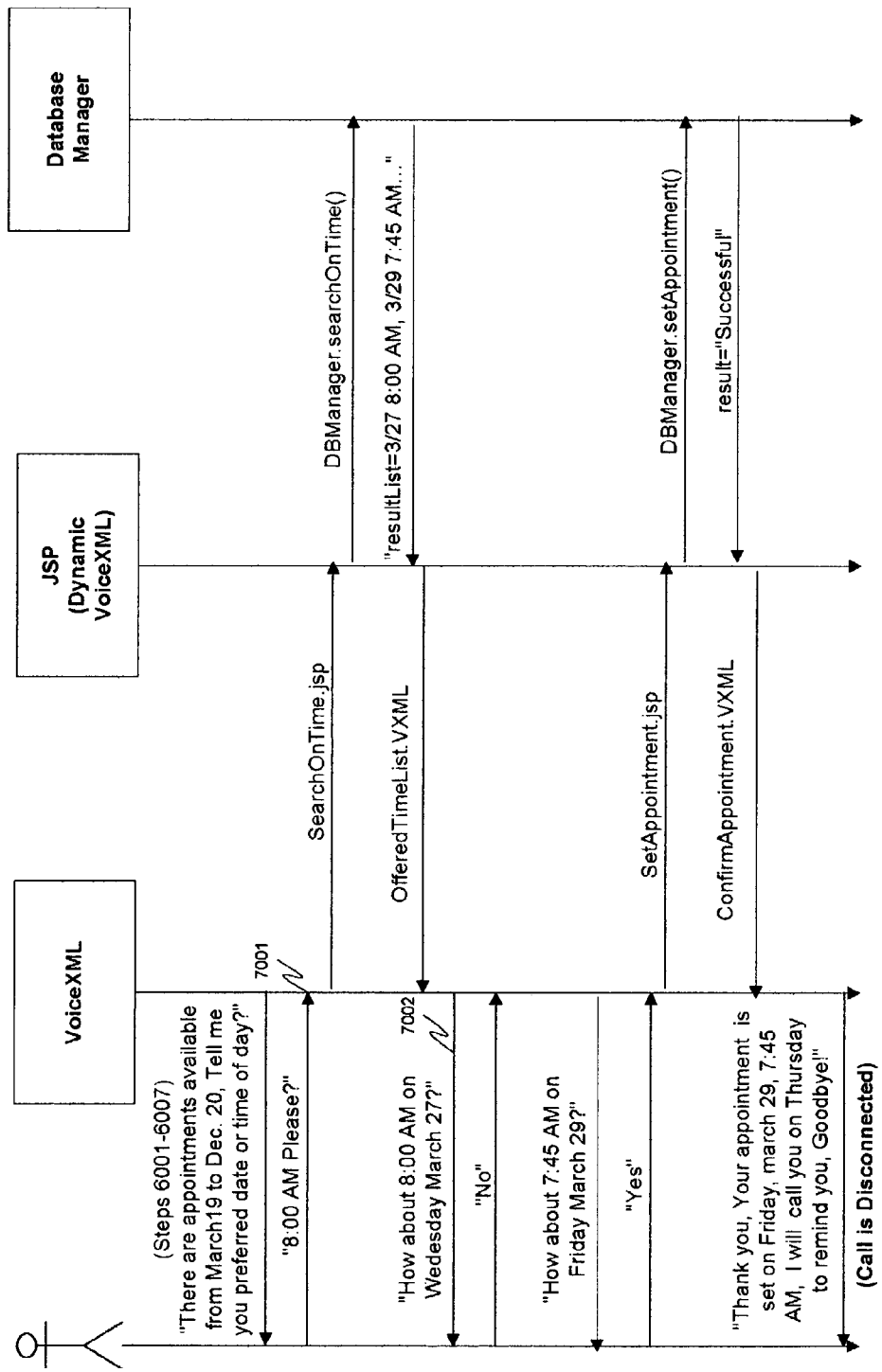
FIG. 7 is an implementation sequence diagram of a call flow in which a user makes an appointment based on his preferred time of day.

Call Flow of "User Makes an Appointment on Preferred Time of Day", FIG. 7

This sequence implements a call flow in which system selects available time slot based on user's preferred time of day. The sequence starts with the same flow as by FIGS. 6A, 6B, steps 6001 through 6007.

Step 7001: The user says a preferred time of day.

Step 7002: The system is able to find dates that have the user's preferred time slot available. The user accepts one of the offered slots.

Call Flow of "Restaurant Reservation", FIGS. 8A, 8B

This call flow automates a reservation service in a restaurant. The reservation service is open to public. Therefore the system requires no pre-defined user profile or ID validation. The call flow demonstrates that certain user information such as telephone number and credit card information can be voice-input on the fly and be saved into appointment/reservation database.

DTMF based user interface is implemented as alternative input mode for user.

Step 8001: The question is designed to separate the party reservation from other services. (When user says no, he may be directed to the reservation booking of a different event or live office administrator assistance). Multiple services or events reservations can be accessed via the same telephone number.

Step 8002: The system prompts can always be used for advertisement, information service as well as for guiding user on how to use the system.

Step 8003: The system is capable of group reservation as shown in this case.

Steps 8004-8006: The user's phone number, credit card information are collected within one VoiceXML page. The DTMF or touch-tone key interface is an alternative to voice input.

Step 8007: The system requests confirmation from the user in order to eliminate input error (ASR or user errors). This step is not necessary but is recommended whenever important user information is collected (such as a credit card number). A user will be given a chance to re-enter the information if he does not confirm it.

Figure 9A:
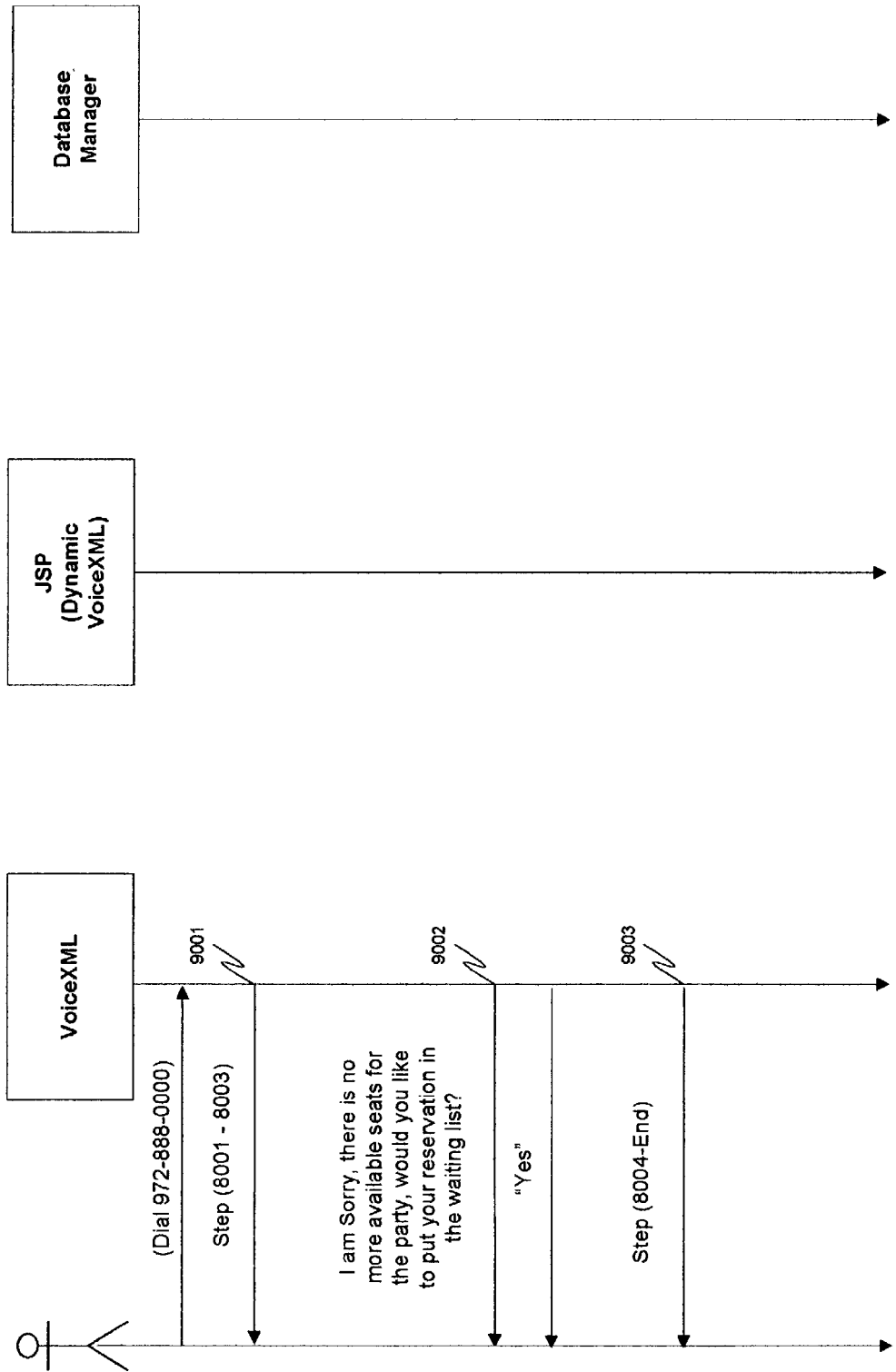
FIGS. 9A, 9B, and 9C provide a complete implementation sequence diagram of a call flow for a waiting list. The waiting list enables a cancelled appointment/reservation to be re-allocated to a user in the waiting list.
Figure 9B:
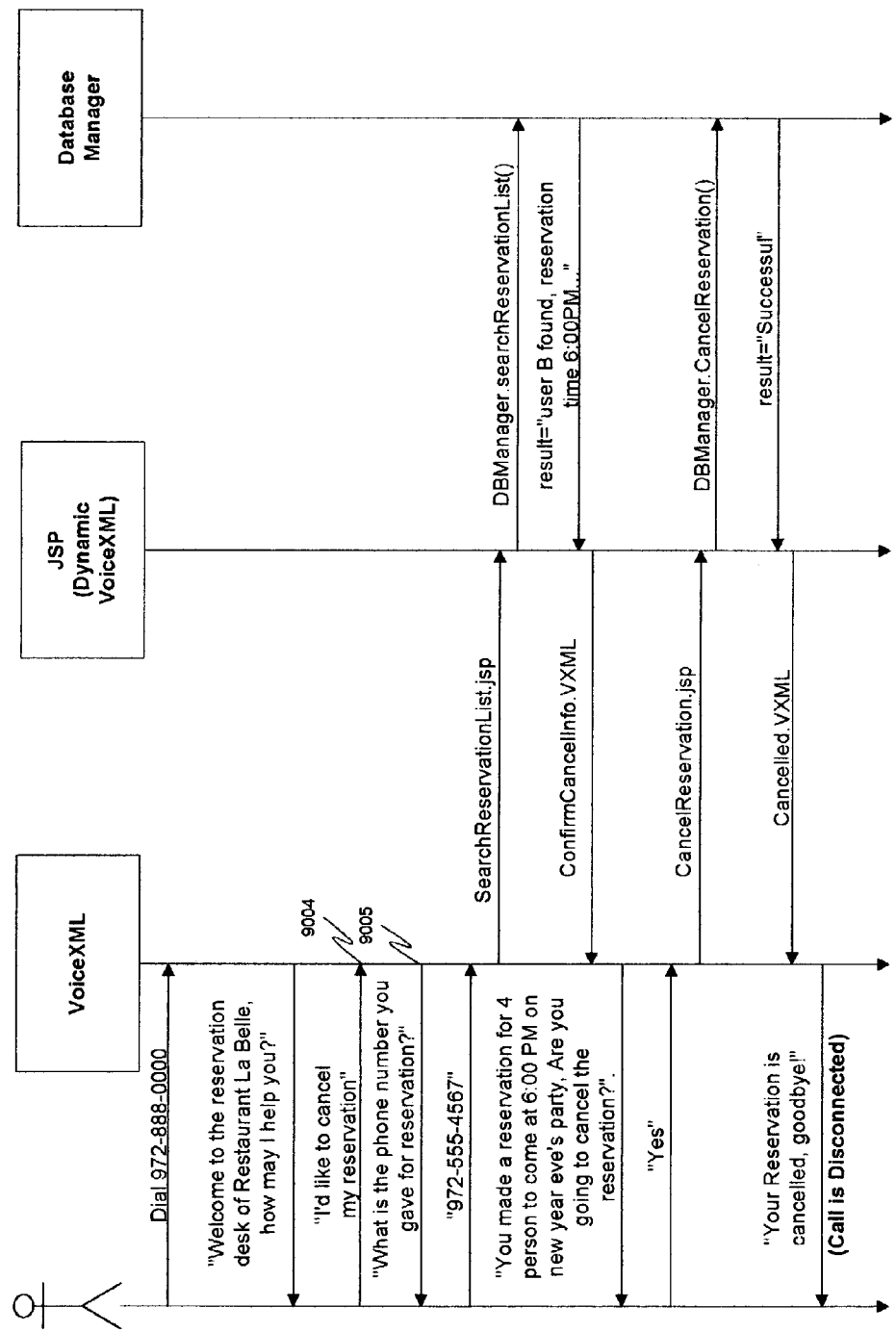
Figure 9C:
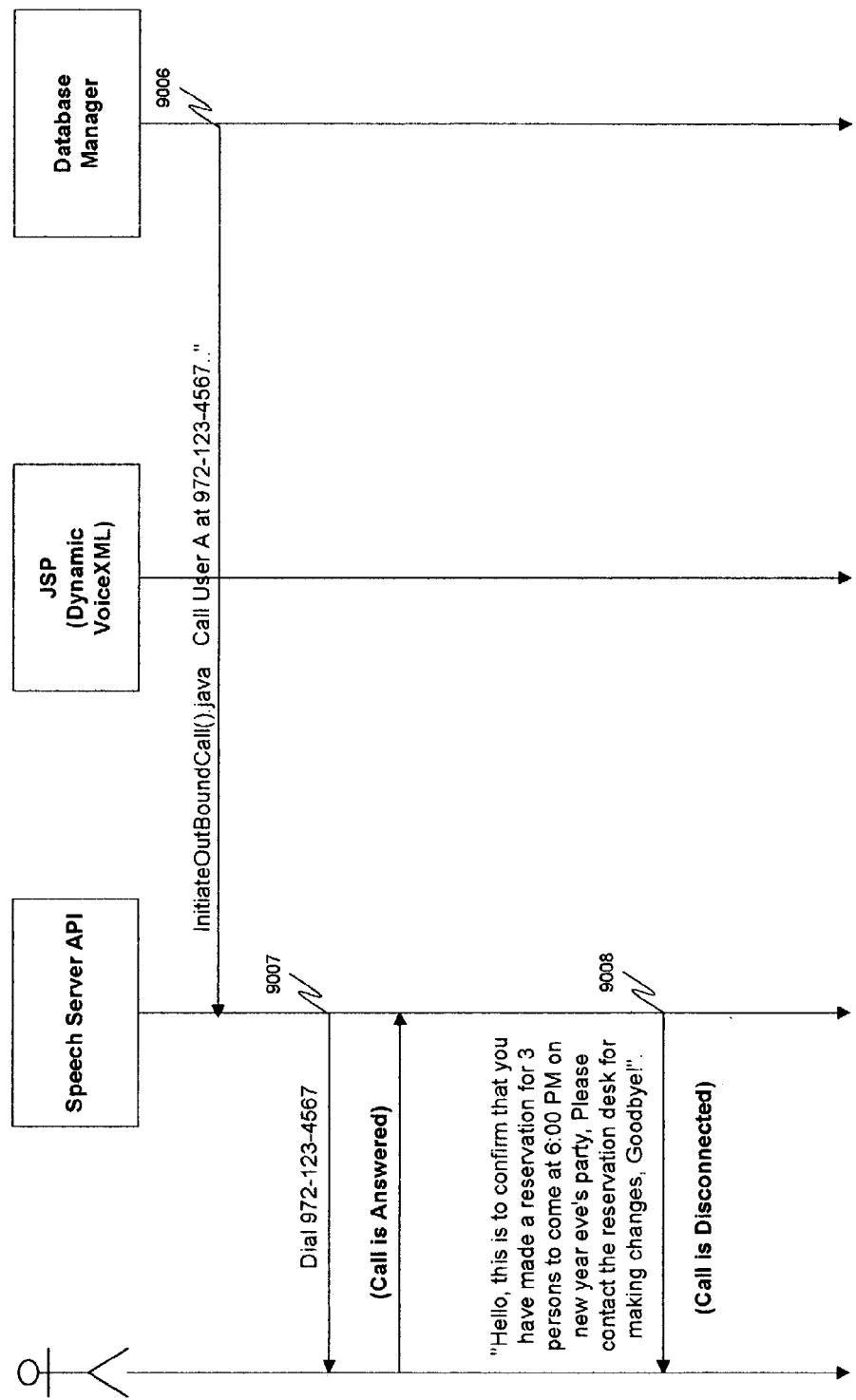

Call Flow of "Waiting List", FIGS. 9A, 9B, 9C

FIGS. 9A, 9B, and 9C show three basic operations of the "Waiting List" feature:

1) A user A saves his reservation request into a waiting list.
2) The system receives and process cancellation request from another user B.
3) The system searches and finds first-in-line user, the user A, in waiting list and determines that user A's request can be accepted. The system notifies the user A of the reservation status change.

For a group reservation, Waiting List service starts when the predefined group capacity is exceeded. For one-on-one business appointment (such as doctor appointment, or private tennis lesson), Waiting List service starts when system failed to find a time slot that matches the user's need.

Step 9001: The user A attempts to make a reservation as in FIG. 8A steps 8001-8003.

Step 9002: The system determines that the maximal reservation capacity has been exceeded for the party. It invokes and offers the "Waiting List" service to the user A.

Step 9003: The user A provides information needed for reservation (same as in FIGS. 8A, 8B steps 8004-End) and the system save the information into the waiting list.

Step 9004: The system receives a request of reservation cancellation from the user B.

Step 9005: The system uses the user B's telephone number to validate his access and identify the reservation record in database. The reservation is subsequently found and cancelled.

Step 9006: The system searches the waiting list and finds the user A to be the first in line user. The system updates the user A's information, change his reservation status from "waiting" to "reserved". The system initiates an outbound call toward the user A's phone number.

Step 9007: The call is originated from the speech server.

Step 9008: Upon call connection, the system informs the user A about the change of his reservation status.

Note that the system initiated automatic outbound calls is also used for sending reminder to users to remind them of their appointment/reservation time. In fact, the communication techniques for alerting and reminder of business schedule are not limited to automated telephone calls. A user's profile may be configured such that he may choose his preferred alerting technique. The system may be configured to determine how early before a scheduled appointment/reservation the reminder is to be sent. Based on these parameters, the system may scan the business schedule database on a regular basis, identify the users to be alerted, initiates automated outbound calls, or emails, or mobile short message services to remind them of the scheduled time and service.

Call Flow of Features "Voice Interactive Helps", FIGS. 10A, 10B

This implementation example in FIGS. 10A and 10B demonstrates a few voice-interactive helps features for users who are unfamiliar with the system.

Refer to the section "Voice User Interface Error Handling and Help Features" for a summary of techniques used to process call flow exception cases or user error handling.

Step 1001: The user asks for help.
Step 1002: The system offers help features that include:
1) Detailed instruction that enlists user's choices or options.
2) A pre-recorded demo of user-system dialog for making appointment/reservation.
3) Transferring the call to the business office where the user can receive live office administrator assistance.

In this example, the user chooses to listen to the demo recording.

Step 1003: When the demo is ended, the system restarts the dialogue.

Step 1004: The system probes the user's preference by providing helping information such as the available search ranges.

Step 1005: <No Input> event occurs when the user fails to respond within a pre-defined time.

Step 1006: Upon timeout, the system may provide further help by providing more information or suggest DTMF (touch tone) input.

Step 1007: To echo the input from the user is another technique the system uses to ensure the accuracy of the speech input. Sometimes the confirmation is made in the form of a direct question such as "you have said . . . , is this correct?" In this step the confirmation is made in an indirect way by echo user's input without asking for a yes/no confirmation. If the user does not say anything negative, the system would move ahead to the next step.

Step 1008: The user did not confirm the selection.

Step 1009: Upon user's reaction, the system restarts the date selection process for the user.

Step 1010: The user wants to talk to a live office administrator for further assistance. Upon his request, the call is transferred to the business office.

The feature of transferring call to business office can also be used in exceptional call flow handling such as when system fails to collect a user's input after a predefined number of retries or, when system fails to find an appointment acceptable by a user after a predefined number of retries. In these situations, the system can initiate the call transfer without being requested by the user.

Call Flow of "Appointment Status Administration", FIGS. 11A, 11B, 11C, 11D, 11E

The implementation sequence in FIGS. 11A, 11B, 11C, 11D and 11E provides a comprehensive example in which a schedule administrator uses the system to perform appointment status checking, set available appointment time, cancel appointments, make calls to users on the appointment list, send fax or print appointment list, all by voice commands.

Step 1101: A schedule administrator first accesses the system with his account ID as a regular user. While validating his user ID, the system identifies him as administrator. The system then uses "Voice Password" or PIN to perform security check on administrator's identity. The administrator is required to either say his voice password phrase or key in his PIN before he can access administration data.

Step 1102: The schedule administrator provides a time range for system to check on appointment status.

Step 1103: The system compiles a list of appointments with associated user information and offers services (administrative tasks) for administrator to select. In this example the services includes sending print/fax of the appointment list, voice-dialing users on the list, and canceling appointments. The administrator chooses voice-dialing users on the list.

Step 1104: The system connects the administrator with the next user on the list. The system announces the appointment time and the user name to the administrator before making the call for confirmation.

Note that with this telephone list voice-dialing feature, the administrator can skip any user on the list and move to call the next one with voice commands. He can also terminate the calling process prior to or after the call connection by voice command or by entering control keys. The implementation of this feature requires that upon call termination each call session resumes process within speech server. (In VXML implementation, the <transfer bridge="true" ... > is set so that when the telephone call terminates, the speech session resumes with the VXML interpreter).

Step 1105: The administrator finishes calling users on the list.

Step 1106: The alerting status of appointments is set in the database to indicate that the users have already received appointment/reservation reminder.

Step 1107: The system is ready for the next administration task.

Step 1108: The administrator requests an appointment status fax. The fax number is retrieved from the administrator's profile and the appointment list is sent by fax. In this case, the fax number may also be provided by the administrator by voice command.

Step 1109: The administrator requests the system to set available appointment/reservation time.

Step 1110: The administrator provides a time range. The available time slots are generated and are stored into the back end database.

Step 1111: The administrator requests canceling appointments.

Step 1112: The administrator provides a time range.

Step 1113: The system confirms with the administrator that the appointments are indeed to be cancelled.

Step 1114: The system will generate automated telephone calls (or emails, or mobile phone short message services) to notify the affected users if the administrator does not make calls via voice dialing.

Call Flow of "User Sign Up Ice Skating Class", FIGS. 12A, 12B

This implementation example in FIGS. 12A and 12B shows a system used for business service sign-up. It also demonstrates the use of voice recording as a means to provide the business administrator with detailed user information that is not ASR recognizable.

New user sign-up service usually consumes significant time for business office administrators. While theoretically it is possible to fully automate a sign-up service by collecting user information using existing speech recognition techniques, it is in reality very hard to achieve satisfactory speech recognition accuracy when user's speech input vocabulary base becomes too big (for example, for input home address by voice, too many street names will lead to very poor ASR performance). One solution to this problem is to combine the old fashioned voice recording into a speech recognition based voice user interface as shown by this example.

Step 1201: The system enlists service offers for the user's choice.

Step 1202: The telephone number is used to establish the customer record as well as contact.

Step 1203: The voice recording is used to record non ASR recognizable user information in order to assist the sign-up administration. In this case, the system needs the user's home address for invoicing.

Step 1204: The user can listen and save the recording if it is satisfactory. Otherwise he can also re-record.

Step 1205: The reservation is complete with the recording information.

To integrate a voice recording with other user account information, the recordings is first saved in audio format files and is assigned an URL (Uniform Resource Locator) address. To protect user information privacy this address must be accessible only by authorized administrator. The URL address is saved together with other user account information in database. When an authorized administrator update or view user account information via GUI (graphic user interface), the recording URL link is displayed together with other textual information. By "point and click" the URL link, the administrator can access the audio files and listen to the voice recording for user information.

Note that alternately, the administrator can also listen to the audio file via natural language voice interface.

What is claimed is:

1. A method of automating business scheduling via the Internet using a natural language voice user interface through which a user directly accesses a scheduling database, to search availability and reserve a time slot based on preferences of said user, said method comprising:
   (a) through said natural language voice user interface providing by way of a first VoiceXML page, to said user at least one available search range for said user selection thereof;
   (b) through said natural language voice user interface providing, by way of a second VoiceXML page, to said user a plurality of search options for said user selection thereof, said plurality of search options including search on preferred date, preferred time of day, and earliest available time slots;
   (c) through said natural language voice user interface, obtaining said user's preferences as required by a selected one of said plurality of search options selected in step (b);
   (d) searching, by way of a third VoiceXML page, said scheduling database for available time slots by applying said selected one of said plurality of search options within a selected one of said at least one available search range selected in step (a) in order to produce a search result;
   (e) selecting a plurality of available time slots from said search result, said plurality of available time slots being closest in time to said user's preference, a total number of said plurality of available time slots not exceeding a predetermined value;
   (f) through said natural language voice user interface providing, by way of a fourth VoiceXML page, to said user said plurality of available time slots for said user selection of a chosen time slot;
   (g) reserving said chosen time slot in said scheduling database for said user; and
   (h) repeating steps (a) through (h), if said search result from step (d) contains no available time slot or if no said plurality of available time slots is chosen by said user in step (f), and only if a predetermined number of repetitions of steps (a) through (h) has not been exceeded;

whereby said user can reserve said preferred time slot by self service.

2. The method of claim 1, further comprising the step of sending schedule reminder to said user via system initiated automated communication.

3. The method of claim 1 wherein said natural language voice user interface is coupled with a touch tone based user interface capable of collecting said user's input through a telephone keypad.

4. The method of claim 1 wherein said natural language voice user interface is coupled with a plurality of predetermined call transfer trigger conditions, said plurality of predetermined call transfer trigger conditions causing said user to be connected to a predetermined service telephone number for live office personnel assistance.

5. The method of claim 1, further comprising the step of placing said user into a waiting list when no available time slot is found, and the step of assigning a newly available time slot to a user of said waiting list on a first come first serve basis.

6. A system of automating business scheduling via the Internet using a natural language voice user interface through which a user directly accesses a scheduling database, to search availability and reserves a time slot based on preferences of said user, said system comprising:

(a) first means, using said natural language voice user interface, for providing, by way of a first VoiceXML page, to said user at least one available search range for said user selection thereof;

(b) second means, using said natural language voice user interface, for providing, by way of a second VoiceXML page, to said user a plurality of search options for said user selection thereof, said plurality of search options including search on preferred date, preferred time of day, and earliest available time slots;

(c) third means, using said natural language voice user interface, for obtaining said user's preferences as required by a selected one of said plurality of search options selected by said second means;

(d) fourth means for searching, by way of a third VoiceXML page, said scheduling database for available time slots by applying said selected one of said plurality of search options within a selected one of said at least one available search range selected by said first means in order to produce a search result;

(e) fifth means for selecting a plurality of available time slots from said search result, said plurality of available time slots being closest in time to said user's preference, a total number of said plurality of available time slots not exceeding a predetermined value;

(f) sixth means, using said natural language voice user interface, for providing, by way of a fourth VoiceXML page, to said user said plurality of available time slots selected by said fifth means for said user selection of a chosen time slot;

(g) seventh means for reserving said chosen time slot in said scheduling database for said user; and (h) eighth means for repeating use of said means in steps (a) through (h), if said search result from step (d) contains no available time slot or if no said plurality of available time slots is chosen by said user in step (f), and only if a predetermined number of repetitions of steps (a) through (h) has not been exceeded;

whereby said user can reserve said preferred time slot by self service.

7. The system of claim 5, further comprising a means for sending schedule reminder to said user via system initiated automated communication.

8. The system of claim 6 wherein said natural language voice user interface is coupled with a touch tone based user interface capable of collecting said user's input through a telephone keypad.

9. The system of claim 6 wherein said natural language voice user interface is coupled with a plurality of predetermined call transfer trigger conditions, said plurality of call transfer trigger conditions causing said user to be connected to a predetermined service telephone number for live office personnel assistance.

10. The system of claim 6, further comprising a means for placing said user into a waiting list, and a means for assigning a newly available time slot to a user of said waiting list on a first come first serve basis.

* * * * *